(12) United States Patent
Boerschig

(10) Patent No.: US 10,836,492 B2
(45) Date of Patent: Nov. 17, 2020

(54) LOAD ADAPTIVE LIFT ASSIST FOR PIVOTING STOWAGE BIN

(71) Applicant: ITT MANUFACTURING ENTERPRISES LLC, Wilmington, DE (US)

(72) Inventor: Timothy J. Boerschig, Amherst, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 772 days.

(21) Appl. No.: 15/474,048

(22) Filed: Mar. 30, 2017

(65) Prior Publication Data
US 2018/0281955 A1    Oct. 4, 2018

(51) Int. Cl.
| | |
|---|---|
| *B64D 11/00* | (2006.01) |
| *F16F 9/56* | (2006.01) |
| *F16F 1/12* | (2006.01) |
| *E05F 1/10* | (2006.01) |

(52) U.S. Cl.
CPC ............ *B64D 11/003* (2013.01); *F16F 1/128* (2013.01); *F16F 9/56* (2013.01); *E05F 1/1058* (2013.01); *E05Y 2201/232* (2013.01); *E05Y 2800/11* (2013.01); *E05Y 2800/21* (2013.01); *E05Y 2800/242* (2013.01); *E05Y 2900/502* (2013.01)

(58) Field of Classification Search
CPC . B64D 11/003; F16F 1/128; F16F 9/56; F16F 9/0245; E05F 1/1058; E05F 2201/232; E05F 2800/11; E05F 2800/21; E05F 2800/242; E05F 2900/502
See application file for complete search history.

(56) References Cited

U.S. PATENT DOCUMENTS

| | | |
|---|---|---|
| 3,980,327 A | 9/1976 | Duran |
| 4,637,642 A | 1/1987 | Stoecker |
| 4,844,520 A | 7/1989 | Muller, Jr. |
| 4,867,417 A | 9/1989 | Williamson et al. |

(Continued)

FOREIGN PATENT DOCUMENTS

| | | |
|---|---|---|
| EP | 1 306 303 B1 | 5/2005 |
| EP | 2 995 554 A1 | 3/2016 |

(Continued)

OTHER PUBLICATIONS

International Search Report and Written Opinion for PCT/US2018/023322; dated Jun. 4, 2018; 11 pages.

*Primary Examiner* — Thomas W Irvin
(74) *Attorney, Agent, or Firm* — Barclay Damon LLP

(57) ABSTRACT

An load adaptive lift assist for a pivoting stowage bin includes an assembly housing having an interior and a pair of opposing end fittings. A piston rod is disposed within the assembly housing and operatively coupled to one of the end fittings, the piston rod being configured to move between extended and retracted positions based on the movement of the pivoting stowage bin. A spring retainer is attached to a structure that retains at least one lift assist spring and a latch mechanism is operatively coupled to the other of the end fittings. The latch mechanism includes at least one mechanical feature for retaining the spring retainer until a predetermined load has been exceeded in the stowage bin. The load adaptive lift assist automatically resets itself and does not require use of sensors or feedback controls.

26 Claims, 25 Drawing Sheets

(56) References Cited

U.S. PATENT DOCUMENTS

| | | |
|---|---|---|
| 5,244,269 A | 9/1993 | Harriehausen et al. |
| 5,549,258 A | 8/1996 | Hart et al. |
| 6,484,969 B2 | 11/2002 | Sprenger et al. |
| 6,814,331 B2 | 11/2004 | Hessling |
| 7,090,314 B2 | 8/2006 | Burrows et al. |
| 7,143,977 B2 | 12/2006 | Graf et al. |
| 7,152,892 B2 | 12/2006 | Rechberg |
| 7,246,771 B2 | 7/2007 | Wisch et al. |
| 7,258,406 B2 | 8/2007 | Stephan et al. |
| 7,367,597 B2 | 5/2008 | Rechberg |
| 7,481,397 B2 | 1/2009 | Steinbeck et al. |
| 7,726,606 B2 | 6/2010 | Graf et al. |
| 7,887,008 B2 | 2/2011 | Lamoree et al. |
| 7,918,418 B2 | 4/2011 | Stephan et al. |
| 7,988,091 B2 | 8/2011 | Wieding et al. |
| 8,016,231 B2 | 9/2011 | Hillen et al. |
| 8,028,957 B2 | 10/2011 | Wolf et al. |
| 8,262,022 B2 | 9/2012 | Young et al. |
| 8,480,029 B2 | 7/2013 | Young et al. |
| 8,500,065 B2 | 9/2013 | Schmid et al. |
| 8,636,439 B2 | 1/2014 | Jaouen |
| 8,770,515 B1 | 7/2014 | Cloud et al. |
| 8,833,698 B2 | 9/2014 | Rafler |
| 8,844,867 B2 | 9/2014 | Graf et al. |
| 8,943,751 B2 | 2/2015 | Ivester et al. |
| 8,955,802 B2 | 2/2015 | Zinke et al. |
| 8,955,805 B2 | 2/2015 | Savian et al. |
| 9,090,351 B1 | 7/2015 | Frazier et al. |
| 9,162,617 B2 | 10/2015 | Savian et al. |
| 9,174,734 B2 | 11/2015 | Savian et al. |
| 9,205,924 B2 | 12/2015 | Geng |
| 9,212,505 B2 | 12/2015 | Geng et al. |
| 9,296,479 B1 | 3/2016 | Eakins |
| 9,457,906 B2 | 10/2016 | Ivester et al. |
| 10,315,768 B2* | 6/2019 | Schorkhuber ............ E05F 3/22 |
| 2002/0175244 A1 | 11/2002 | Burrows et al. |
| 2003/0080247 A1 | 5/2003 | Frazier |
| 2004/0222579 A1 | 11/2004 | Adoline et al. |
| 2005/0230541 A1 | 10/2005 | Graf et al. |
| 2008/0073462 A1 | 3/2008 | Wolf et al. |
| 2008/0078868 A1 | 4/2008 | Lamoree et al. |
| 2008/0078870 A1 | 4/2008 | Kneller et al. |
| 2008/0078871 A1 | 4/2008 | Munson et al. |
| 2011/0139929 A1 | 6/2011 | Young et al. |
| 2011/0253714 A1 | 10/2011 | Ivester et al. |
| 2011/0254705 A1 | 10/2011 | Hashberger et al. |
| 2012/0213576 A1 | 8/2012 | Jaouen |
| 2012/0325963 A1 | 12/2012 | Young et al. |
| 2013/0247625 A1 | 9/2013 | Geng et al. |
| 2014/0197721 A1 | 7/2014 | Savian et al. |
| 2015/0123526 A1 | 5/2015 | Ivester et al. |
| 2016/0002965 A1 | 1/2016 | Janak et al. |
| 2016/0075433 A1 | 3/2016 | Eakins |
| 2018/0258673 A1* | 9/2018 | Schoerkhuber ......... E05O 17/50 |
| 2018/0319501 A1* | 11/2018 | Schorkhuber ............ E05F 3/22 |

FOREIGN PATENT DOCUMENTS

| | | |
|---|---|---|
| JP | 2013-525182 | 6/2013 |
| JP | 5638689 | 10/2014 |
| WO | WO 2011/133601 A2 | 10/2011 |

* cited by examiner

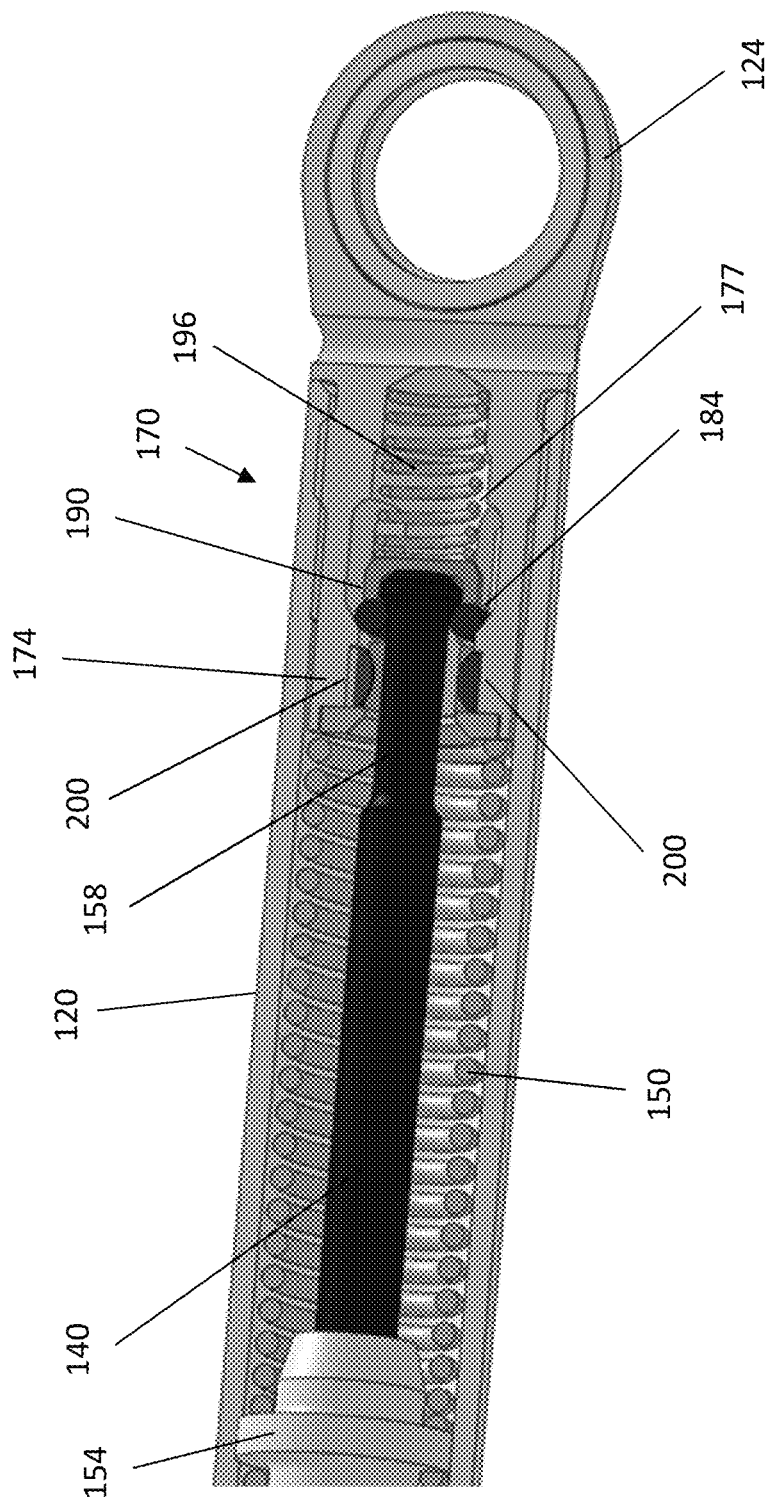

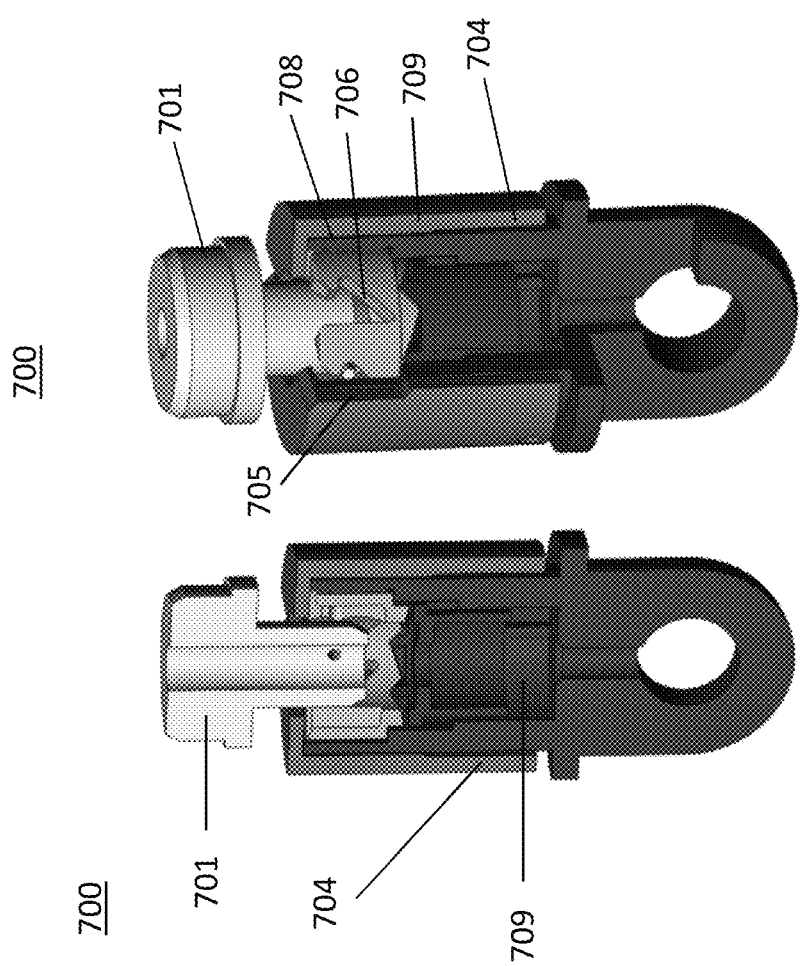

LOAD ADAPTIVE LIFT ASSIST FOR PIVOTING STOWAGE BIN

TECHNICAL FIELD

This application is directed generally to lift assist assemblies and more specifically to a load adaptive lift assist assembly for a pivoting stowage bin, such as those used on commercial aircraft. The load adaptive lift assist assembly is automatically enabled only when the weight/load in the pivoting stowage bin has exceeded a predetermined threshold.

BACKGROUND

Pivoting stowage bins are presently used in a number of commercial aircraft. These bins pivot downwardly when opened and present the bin bucket for purposes of loading. The bins are closed by moving and pivoting the bin upwardly and latching same in the closed position. An issue in the use of such stowage assemblies is that the attendant or other user encounters greater force when closing the stowage bin when the bin is filled with luggage than when the bin is empty or only partially filled. This issue can be exacerbated when the attendant is required to successively close a number of these stowage bins during pre-flight.

Efforts have been made to introduce lift assist assemblies into commercial aircraft stowage bins. A number of these assistive assemblies are very sophisticated and complex, some requiring the use of specific sensors and software to perform the required functions such as found in U.S. Pat. Nos. 7,258,406 B2, 7,723,935 B2 and 7,893,645 B2. These systems in fact require a power source and require additional controls be added to the aircraft. Still other versions employ expansive mechanical solutions, such as those described by U.S. Pat. Nos. 6,691,951 B2 and 7,090,314 B2.

Overall, each of these assemblies introduce levels of complexity and cost in terms of their manufacture and maintenance. Generally, there is a need in the field to provide a simpler and cost effective and reliable solution.

BRIEF DESCRIPTION

Therefore and according to one aspect, there is provided a load adaptive lift assist for a pivoting stowage bin. The adaptive lift assist includes an assembly housing having an interior and a pair of opposing end fittings. A piston rod disposed within the housing is operatively coupled to one of the end fittings, the piston rod configured to move between extended and retracted positions based on the movement of the pivoting stowage bin. A spring retainer is attached to a structure that retains at least one lift assist spring and a latch mechanism is fixedly coupled to the other of the end fittings, the latch mechanism including at least one feature for retaining the spring retainer until a predetermined load in the stowage bin has been exceeded, allowing the at least one lift assist spring to be released.

In at least one version, a hydraulic damping assembly can also be provided in the assembly housing to provide damping for the piston rod.

The latch mechanism locks out the lift assist force unless a predetermined amount of force has been exceeded, the predetermined amount of force being based on a load measurement spring in accordance with at least one version. In one version, the spring retainer includes a flexible sleeve which is configured to move within a limited range and configured to assist in enabling or disabling the latch mechanism. The sleeve assists in resetting of the mechanism and enabling the release of the load assist force. According to at least one version, the flexible and movable sleeve is disposed onto the piston rod and cooperates with features of the latch mechanism to create effective locking and unlocking states.

According to another aspect, there is provided a pivoting bin assembly comprising a bin bucket and an adaptive lift assist assembly. The adaptive lift assist comprises an assembly housing having an interior and a pair of opposing end fittings. A piston rod disposed within the housing is operatively coupled to one of the end fittings, the piston rod configured to move between extended and retracted positions based on the movement of the pivoting stowage bin. A latch mechanism is coupled to the other of the end fittings, the latch mechanism including at least one feature for retaining a lift assist spring retaining structure, until a predetermined load in the stowage bin has been exceeded.

The lift assist provides a spring force when activated and a different or no spring force when deactivated. The design is intended to permit activation and deactivation of the additional spring force provided by the load adaptive lift assist, when needed.

The structure used to retain the latch mechanism according to one version can include a set of pins that are configured to move in relation to the latch mechanism based on the amount of load applied and in which the movement of the pins delays the action of the latch mechanism in retaining the spring retainer. In another version, a set of balls can be used in lieu of pins, the balls also being movable between various positions relative to the latch mechanism to enable or delay action of the latch mechanism based on the amount of load (weight) in the stowage bin, and thereby also enabling the lift assist. In yet another version, a series of extending pins and hooks can be used in conjunction with camming features, such as defined slots, in which the latch mechanism is configured to release the lift assist based on an applied load. In one such version, camming pieces are configured to move only axially under lighter loads, but in which at least one camming piece is configured to rotate under higher loads, this latter movement enabling the lift assist.

In each of the above versions and according to the present invention, the lift assist force is not enabled by a simple toggle action. That is, the lift assist is activated or deactivated according to the amount of load applied in its compressed state (or alternatively in its extended state in the case of a tension spring). Once a sufficient load is applied in the compressed state, the lift assist will remain active during each operating cycle until the applied load falls below the threshold for activation—at which point the herein described lift assist will automatically be deactivated.

The automatic deactivation or reset described above also solves potential issues that are associated with any of the lift assists that utilize a toggle-action for application of the lift assist force.

Advantageously, the herein described lift assist does not require external manipulation of a switch or any other external input (e.g., electrical measurement) to determine an activated or a released state.

Components of the herein described lift assist are easier to manufacture—with simpler machining, extrusion, stamping or forming of metal parts and resulting in lower costs. In a preferred embodiment, machined profiles can be made by most conventional machining methods.

The geometry of the herein described load assist assembly can be maintained in an axial cylindrical configuration. As such, the assembly can be assembled in any attitude and in any orientation about its primary (cylindrical) axis. Installation of the herein described assembly is the same as for any standard spring actuator or rate control. The coaxial assembly further presents a compact, simple space envelope for installation within small gaps between stowage bins and end panels. The size of the lift assist assembly is predominantly dependent upon installation space, interface, and the force and kinematic requirements of the system, which are typically driven by the end user.

The lift assist force, load "measuring" and activation/release mechanism are all self-contained. There is no need for external power sources (e.g., electrical), external solenoid, or hydraulic accumulator. There are also no additional mechanical connections required for load sensing or control of the activation/release state of the assembly.

Another advantage of the herein described load assist assembly is that of increased reliability. The present assembly is defined with fewer parts than other "smart" lift or load assist systems and the lack of electrical components in the present assembly translates into system operation that is not affected by a loss of power.

Yet another advantage is that the herein described lift assist assembly does not require the use of specific sensors.

Because the herein described lift assist is not just a simple toggle-action device, as typified by other assemblies, the herein described assembly does not present the same problems associated with trying to get two lift assists, used on the same stowage bin, back into sequence with one another. Should one lift assist become active but not the other, a single open-close cycle of the bin should bring both lift assists back into the same operating state. Prior "toggle-action" lift assists, on the other hand, would be more likely to change operating states, but these states would remain out of sync with each other.

A load activated lift assist as described herein would permit an empty stowage bin to stay fully open under its own weight. On the other hand, other known lift assists such as "full time" lift assists that do not deactivate would have a greater tendency to close an empty bin at least partially. This effect would make loading and unloading of the pivoting bin more cumbersome.

The herein described lift assist can be supplied with simple, pivoting attachment ends that are typical for existing stowbin rate controls and non load-activated lift assists. Other known lift assist assemblies require special fastening systems, brackets, and/or external linkages. As a result, the herein described lift assist can be used as a "drop-in" replacement for existing springs/dampers. Additionally, the herein described load adaptive lift assist can be configured for both compressive as well as tension spring force and/or an integral tension or other damper.

These and other advantages and features will be readily apparent from the following Detailed Description, which should be read in conjunction with the accompanying drawings.

BRIEF DESCRIPTION OF THE DRAWINGS

So that the manner in which the features of the invention can be understood, a Detailed Description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following Detailed Description, read in connection with the drawings in which:

FIG. 3(b) is the enlarged view of the load adaptive lift assist assembly of FIG. 3(a), as fully sectioned;

FIGS. 21(a), 21(b) and 22 are partial sectioned views of other load adaptive lift assist assemblies made in accordance with various embodiments that are each based on camming action.

DETAILED DESCRIPTION

The following describes certain varied embodiments of a load adaptive lift assist assembly for use with a pivoting stowage bin such as those used in commercial aircraft. It will be understood, however, that the concepts herein described may be further employed in a variety of applications such as life raft stow systems, other movable stowage systems, heavy lid/door systems, product and tool handling equipment in production environments, movable workstations/tables and other ergonomic systems as well as other product types including actuator/rate controls, struts, linkages, and the like. It will be readily apparent from this discussion that other suitable designs of the adaptive assembly can be contemplated for use for purposes of functionally enabling a lift assist force automatically upon transmission of a load exceeding a predetermined threshold. In addition, several terms are used throughout the course of discussion for purposes of providing a suitable frame of reference in regard to the accompanying drawings. These terms which include "above", "below", "interior", "exterior", "distal", "proximal", and the like are not intended to narrow the scope of the herein described invention, except where so specifically indicated.

Figure 1:
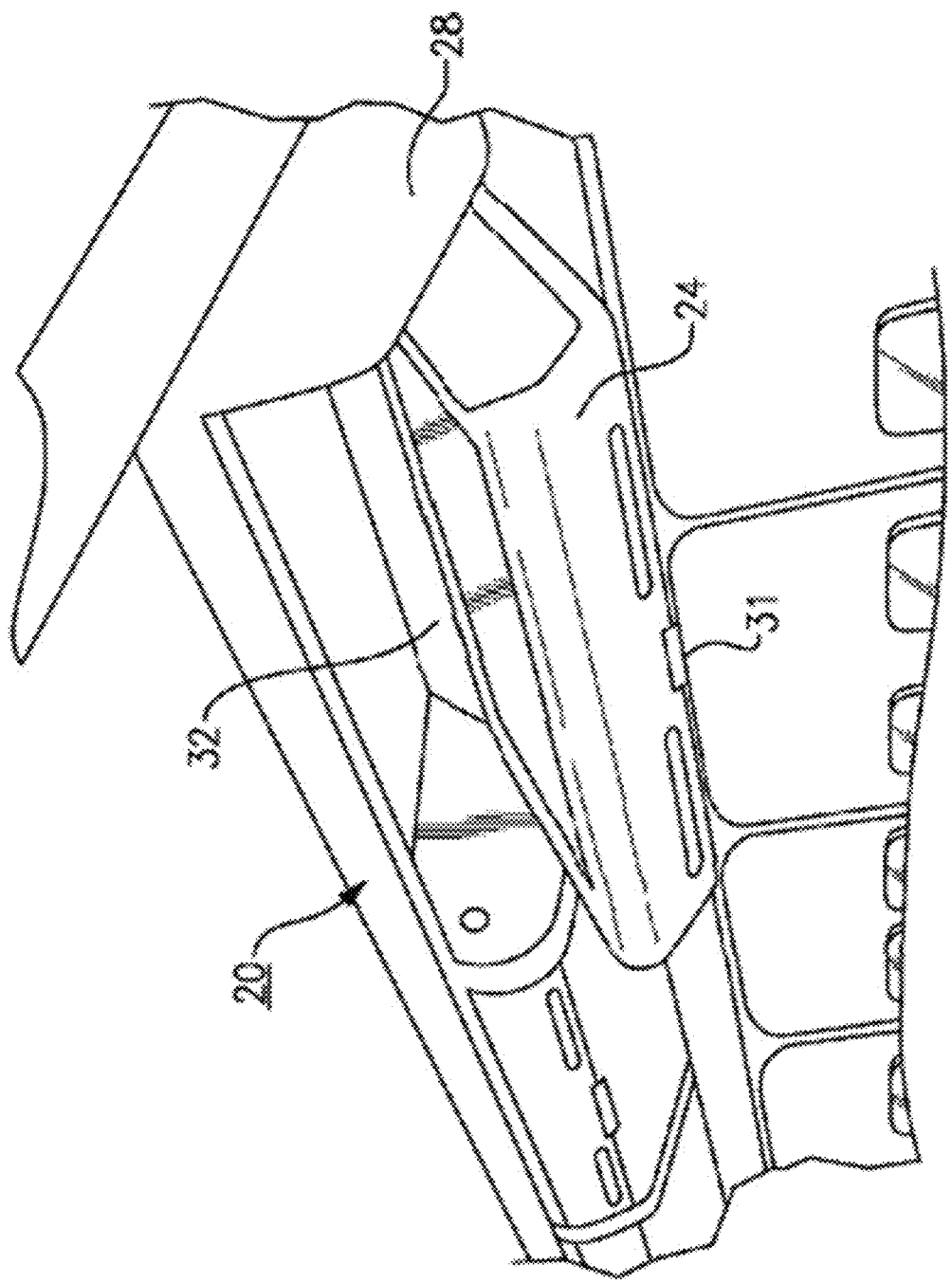
FIG. 1 is a perspective view of a pivoting stowage bin.

Referring to FIG. 1, there is depicted a stowage bin assembly 20 that can be modified or designed to accommodate an adaptive load assist as described herein. The stowage bin assembly 20 is defined by a pivoting bin bucket 24 having an interior compartment 32 that is sized and configured to retain luggage. The bin bucket 24 is movable between the depicted open position that permits luggage to be loaded and unloaded from the bin and a closed position. The stowage bin assembly 20 includes at least one latch 31 and in which the bin bucket 24 is attached to a fixed wall of the aircraft 28. The herein described lift assist can be used in conjunction with a rate control (not shown) in order to close the stowage bin 20 with greater ease in spite of a filled bin bucket 24.

Referring to FIGS. 2(*a*) and 2(*b*), there are shown representative side elevational views of a load adaptive lift assist assembly in accordance with a first embodiment and which can be used in conjunction with the stowage bin of FIG. 1. The adaptive lift assist assembly 100 according to this embodiment is defined by an assembly housing 120 having end fittings 124, 128 disposed at opposing ends wherein the assembly housing is defined by a cylindrical axial configuration. One of the end fittings 124 is fixedly attached to the assembly housing 120, while the remaining end fitting 128 receives one end 133 of an axially movable piston rod 132. The assembly housing 120 is defined by a hollow interior 136 that is configured and sized to retain a number of components. The opposite end 137 of the piston rod 132 is configured to extend through a bearing assembly 135 and into the hollow interior 136 of the assembly housing 120 and engage a cap 142, which is fixedly secured to one end of a spring retainer 140.

The spring retainer 140 is a cylindrical section that extends axially toward the end fitting 124 of the assembly housing 120 and includes opposing ends 146, 148. The diameter of the spring retainer 140 is substantially constant over its length with the exception of a narrowed diametrical portion 158 adjacent the end 146. As discussed herein, the end 146 of the spring retainer 140, including the narrowed diametrical portion 158 is configured and sized for engagement with a latch mechanism 170.

The cap 142 overlays the end of the spring retainer 140 and includes a shoulder 145 that is configured to be secured to one end of a coil spring 150 for compression of same. The remaining end of the coil spring 150 is secured to the latch mechanism 170 and more specifically an inner end of a cylinder end body 174. According to this embodiment, a pair of coil springs 150 are provided in a linear configuration. A separate retainer 154 is disposed onto the spring retainer 140 including an outer radial flange for engaging respective ends of the arranged coil springs 150. In this configuration, the coil springs 150 are maintained in compression within the hollow interior 136 of the assembly housing 120. As discussed herein, the coil springs 150 are configured to provide a lift assist force for the assembly 100. The number and configuration of the coil springs 150 can be suitably varied.

According to this embodiment, a heavy load measurement spring 160 is attached to the movable end fitting 128 in which one end of the spring 160 engages the assembly housing 120.

Figure 3A:
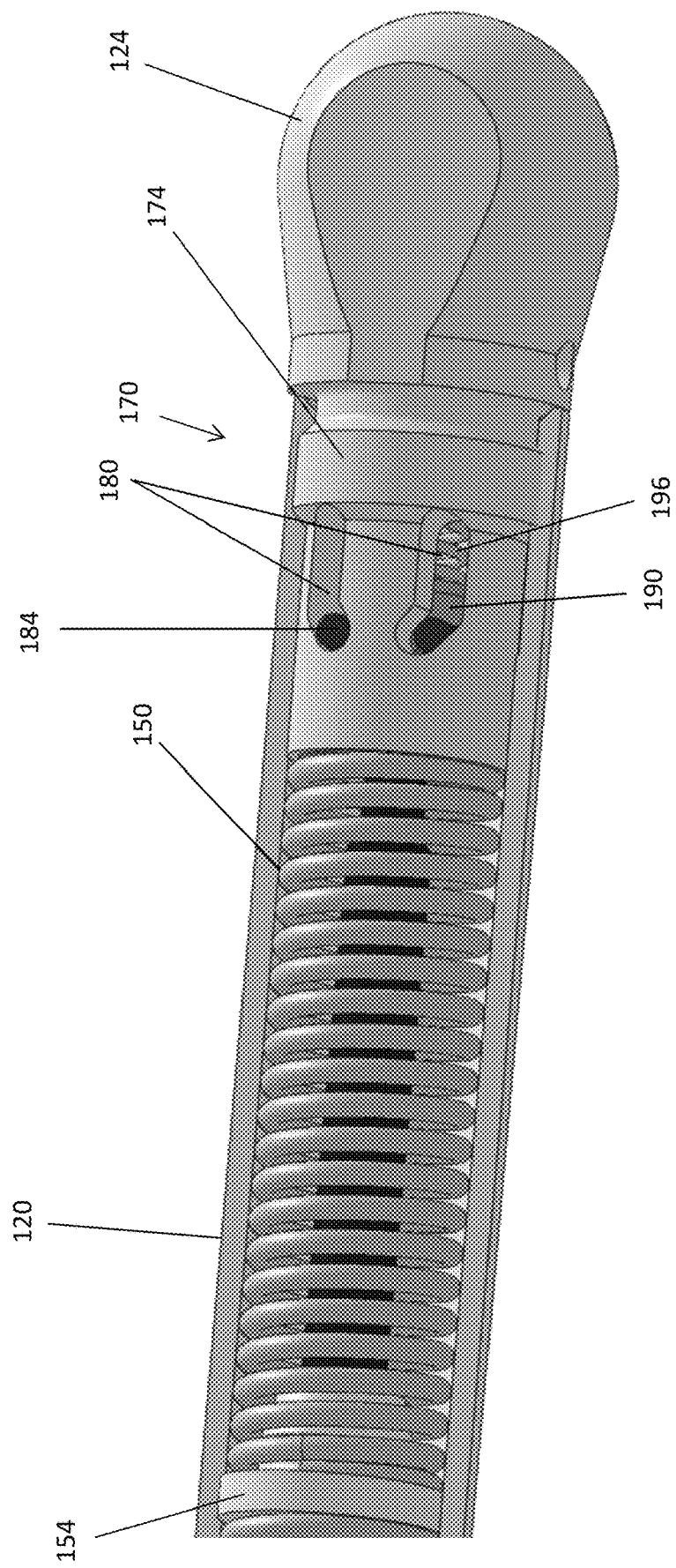
FIG. 3(a) is an enlarged view of the sectioned load adaptive list assist assembly of FIGS. 2(a) and 2(b)
Figure 4:
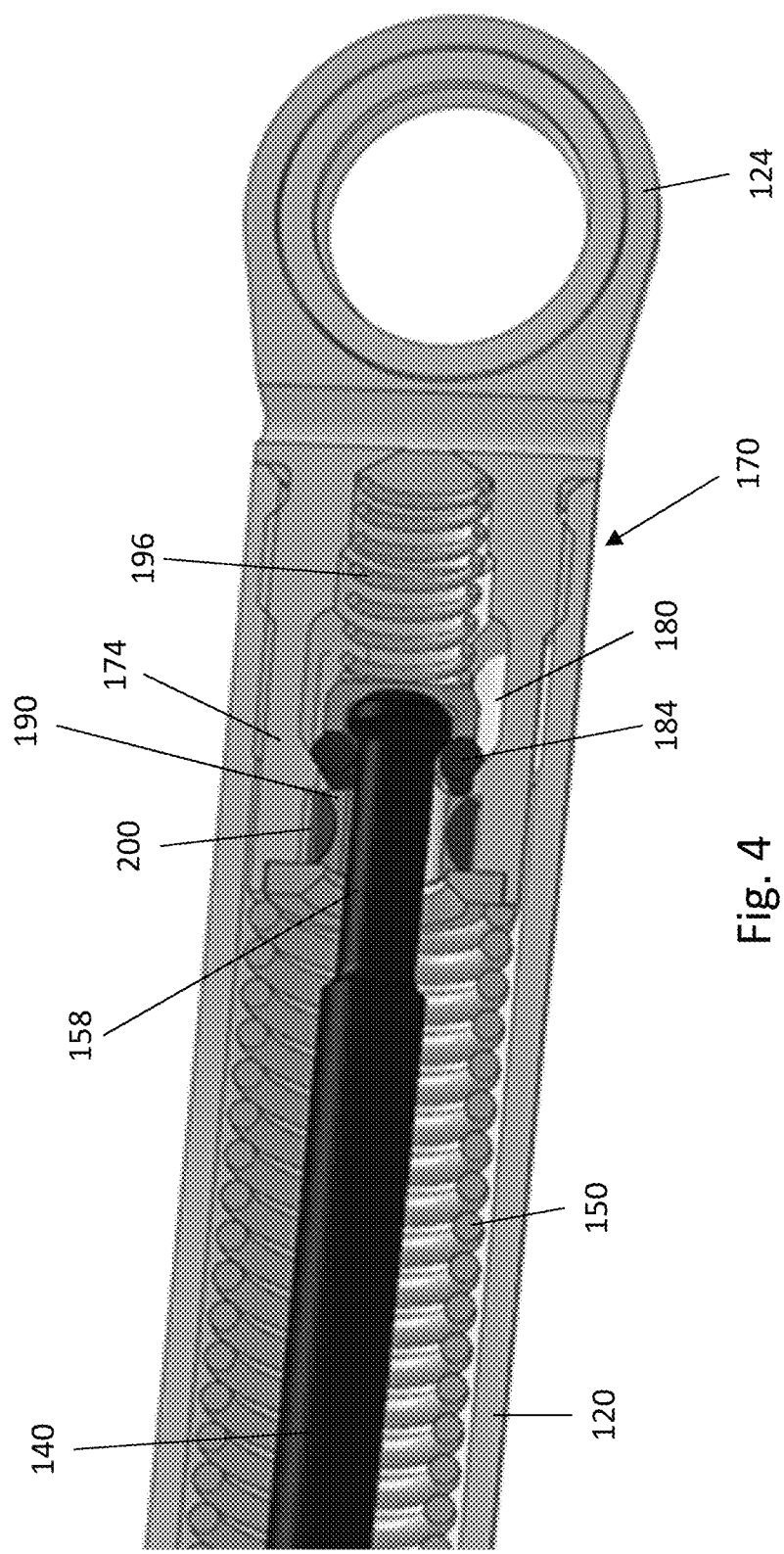
FIGS. 4-11 are side elevational views of the load adaptive lift assist of FIGS. 2(a)-3(b) in operational sequence, depicting the operation of the adaptive lift assist.

With reference to the enlarged end views of FIGS. 3(*a*) and 3(*b*), the latch mechanism 170 is defined according to this embodiment by the end cylinder body 174, which is fixedly attached to the end fitting 124. The end cylinder body 174 includes an end surface against which one end of the coil spring 150 is secured and an opening that is large enough to permit the passage of the spring retainer 140. The end cylinder body 174 is further defined by an inner cavity 177 that retains a number of components. More specifically, the end cylinder body 174 is further provided with a set of profiled slots 180, shown most clearly in FIG. 3(*a*), that are sized to receive a corresponding set of dowel pins 184. The end cylinder body 174 further retains a poppet retainer 190, a poppet retainer spring 196 and a set of retainer spring clips 200. The poppet retainer 190 is sized and configured to receive the end of the spring retainer 140, the poppet retainer 190 being biased by the poppet retainer spring 196 having one end secured to the poppet retainer 190 and the opposite end engaged against the distal end of the inner cavity 177 of the end cylinder body 174 (the end closest to the end fitting 124). The retainer spring clips 200 are disposed adjacent the proximal end of the end cylinder body 174; that is, the end closest to the coil spring 150. More specifically and according to this embodiment, the retainer spring clips 200 are disposed within a recessed portion of the inner cavity 177 adjacent to an interior shoulder and the end opening of the latch mechanism 170.

In brief, the end cylinder body 174 provides connection with the movable system interface and houses the latch mechanism components. The dowel pins 184 are configured to ride within the corresponding slots 180 that are formed in the end cylinder body 174. The slots 180 have a profiled path for locking and unlocking the spring force. The pins 184 also engage slots (not shown) formed in sides of the poppet retainer 190 and the narrowed diametrical portion 158 on the spring retainer 140. As discussed herein, locking and unlocking of the spring retainer 140 according to this embodiment occurs between the narrowed diametrical portion 158 in the spring retainer 140, the dowel pins 184, and the profiled slots 180 of the end cylinder body 174.

The poppet retainer 190 is spring loaded toward the coil springs 150. The poppet retainer 190 moves in relation with the spring retainer 140 when engaged, maintains relative position of the dowel pins 184 with the narrowed diametrical portion 158 of the spring retainer 140. As discussed herein and according to this embodiment, the retainer spring clips 200 are disposed within the recessed portion of the inner cavity 177 of the end cylinder body 174 and configured to collapse in order to retain the poppet retainer 190 and the dowel pins 184 in a predetermined state when the poppet retainer 190 is depressed below a bottom edge of the retainer spring clips 200. Axial grooves formed in the poppet retainer 190 permit the tips of the retainer spring clips 200 to extend through to the inside diameter of the poppet retainer 190. The poppet retainer spring 196 provides a biasing force on the poppet retainer 190 in order to maintain a default locked condition so that automatic reset of the herein described lift assist 100 is enabled.

The piston rod 132 is a slidable cylindrical feature configured to compress the springs 150, 196 by pushing against the capped end of the spring retainer 140. When the lift assist spring force is locked, the piston rod 132 slides freely in and out of the assembly 100 without resistance from the internal springs. When the internal lift assist spring force is released, the capped end of the spring retainer 140 transmits the spring force through the piston rod 132 to provide the lift assist. The rod end fitting 128 is connected to the piston rod 132 and provides an interface connection with the movable system. The heavy load measurement spring 160 is further provided according to this embodiment in order to provide the additional spring force used to distinguish between activated and deactivated states.

With reference to FIGS. 4-11, a sequence of operation is described for the adaptive lift assist in accordance with this embodiment. First and with reference to FIG. 4, the load adaptive lift assist assembly 100 is shown in the locked or deactivated state due by the locking/latching of the spring retainer 140 in the latch mechanism 170. In this position, the poppet retaining spring 196 is acting against the poppet retainer 190, which is engaged with the end of the spring retainer 140. The locking action takes place between the narrowed diametrical portion 158 of the spring retainer 140, the dowel pins 184 and the profiled slots 180 of the end cylinder body 174. More specifically, the dowel pins 184 are disposed in the position shown in FIG. 3(a) in the profiled slots 184 of the end cylinder body 174. In this position, the dowel pins 184 act against the poppet retainer 190 and end of the spring retainer 140 with the dowel pins 184 within the narrowed diametrical portion 158 of the spring retainer 140. Furthermore and in this position, the poppet retainer 190 additionally restrains the retainer spring clips 200 to prevent axial movement of the spring retainer 140 toward the end fitting 128. While in this locked position, the movement of the piston rod 132, FIG. 2(b), is unaffected, wherein the piston rod 132 is axially movable as the pivoting bin is opened and closed.

Figure 5:
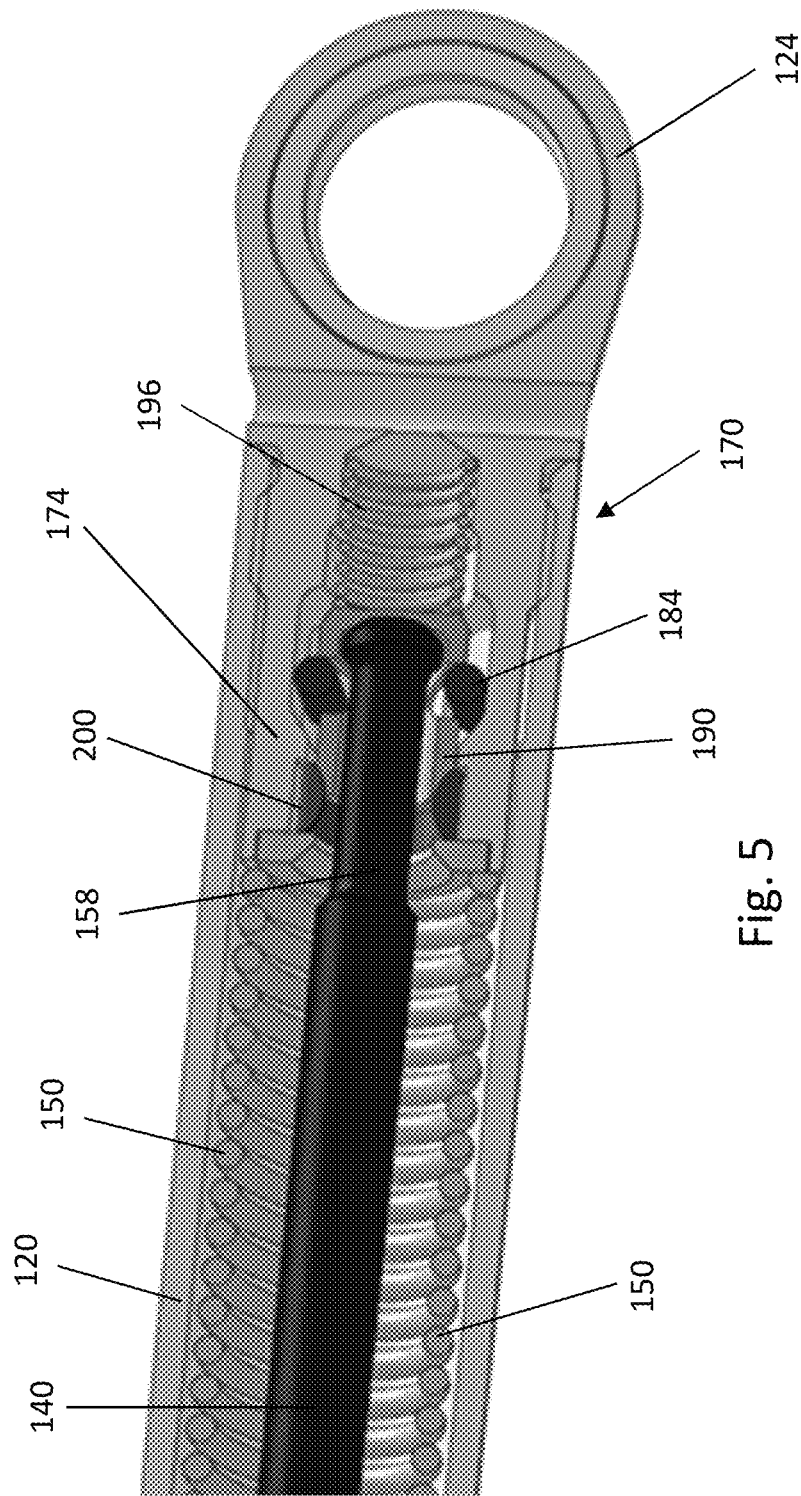

FIG. 5 shows how the interaction between the retainer spring clips 200, the poppet retainer 190 and the spring retainer 140 is instrumental to providing an automatic reset function. As discussed herein, the retainer spring clips 200 can be replaced by other features such as wire forms or spring-loaded pins. Similarly, the dowel pins 180 that are configured and sized to slide in the profiled slots 184 of the end cylinder body 174 may also be replaced by balls located within a slidable sleeve.

The heavy load measurement spring 160 is important for providing additional spring force to distinguish between activated and deactivated operating states of the herein described assembly. Without this additional force to "gauge" between a moderate and heavy load, it would be quite difficult for an operator to deactivate the internal spring force without bypassing the "lock-out" or latching region and simply reactivate the load assist. According to this embodiment, the heavy load measurement spring 160 is placed at the opposite end of the lift assist assembly 100 so that the latch mechanism 170 did not have to withstand the additional forces of this spring 160. Alternatively, the heavy load measurement spring could be incorporated within the latch mechanism 170 or the load-distinguishing feature could be replicated elsewhere in the application by a suitable external means.

Operationally and as shown in FIG. 5, the load adaptive lift assist according to this embodiment is compressed as the bin is opened and until the bias of the heavy load measurement spring assembly 160 is overcome such that the latter spring is caused to compress. FIG. 5 illustrates operation in which the bias of the heavy load measurement spring 160 has not been overcome. In this position, the spring retainer 140 is advanced axially and further engages the poppet retainer 190 against the bias of the poppet retaining spring 196. As the poppet retainer 190 is axially shifted, the dowel pins 184 are caused to advance outwardly and axially into the profiled slots 180 of the end cylinder body 174 as the spring retainer 140 engages the poppet retainer 190.

The adaptive lift assist assembly 100 according to this embodiment will still remain deactivated or "locked" if extended at this point; that is, upon movement of the piston rod toward the end fitting 128 for purposes of closing the bin. That is, the spring retainer 140 will remain locked by the latch mechanism 170 as the spring-biased poppet retainer 190 will move in concert with the spring retainer 140 and redirect the dowel pins 184 into the narrowed diametrical portion 158 of the spring retainer 140, thereby resuming the locked position of FIG. 4 with the retainer spring clips 200 further preventing movement of the spring retainer 140 from the latch mechanism 170. Any subsequent opening and closing of the stowage bin under these conditions will repeat the sequence of FIGS. 4 and 5 with the load adaptive lift assist assembly 100 remaining in the latched, deactivated or locked state.

Figure 2A:
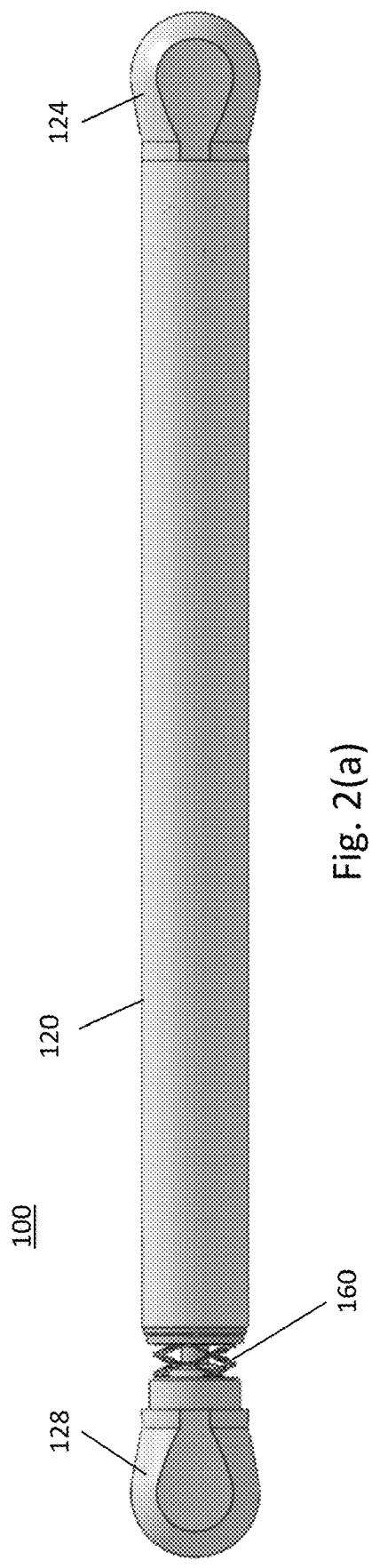
FIG. 2(a) is a side elevational view of a load adaptive lift assist assembly in accordance with a first embodiment.
Figure 2B:
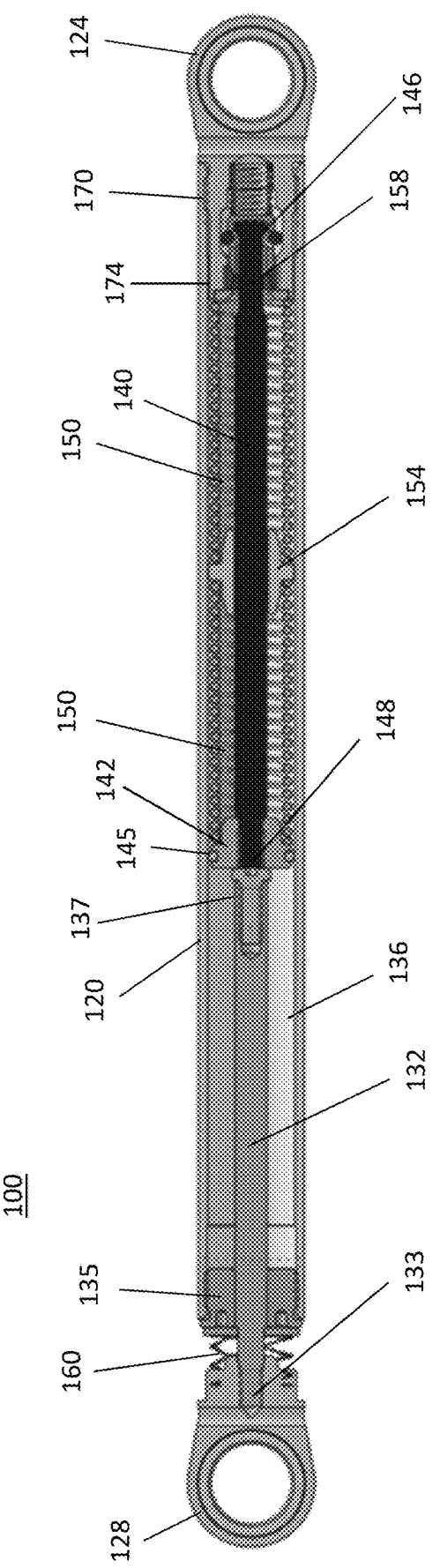
FIG. 2(b) is the side elevational view of the load adaptive lift assist assembly of FIG. 2(a), in section.
Figure 6:
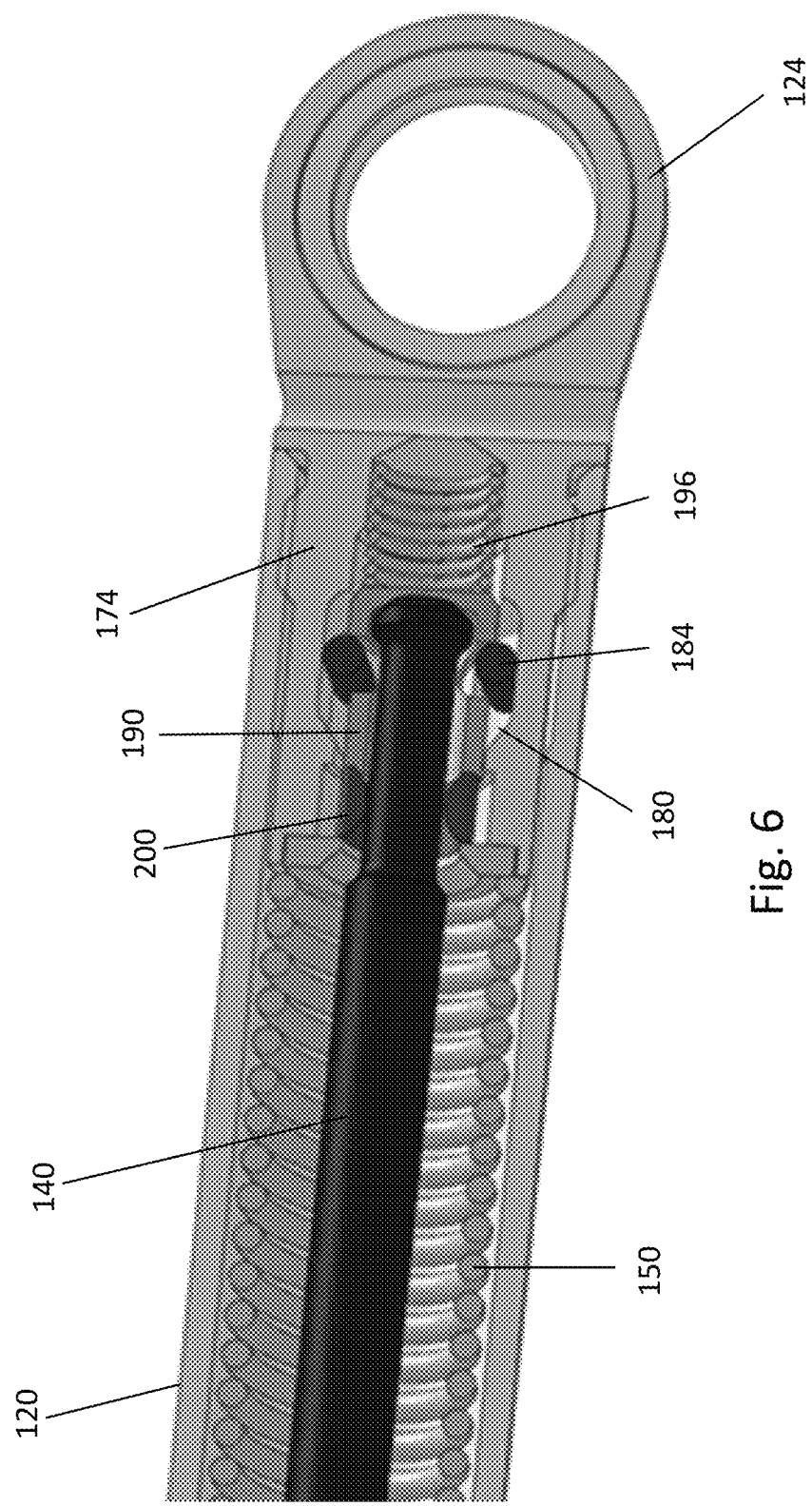

With reference to FIG. 6 and upon application of a heavier load in the stowage bin that is sufficient to compress the heavy load measurement spring 160, the piston rod 132, FIG. 2(a) will further advance against the capped end of the spring retainer 140, causing the spring retainer 140 to further axially advance against the poppet retainer 190, as shown, further overcoming the bias of the poppet retaining spring 196. At this point, the retainer spring clips 200 will collapse inwardly against the narrowed diametrical portion 158 of the spring retainer 140 due to the additional axial movement of the poppet retainer 190, as the retainer spring clips 200 are manufactured to a smaller diameter than that of the poppet retainer 190. Even in the collapsed position, the retainer spring clips 200 are prevented from axial movement due to their retention within the recessed portion of the end cylinder body 174.

Figure 7:
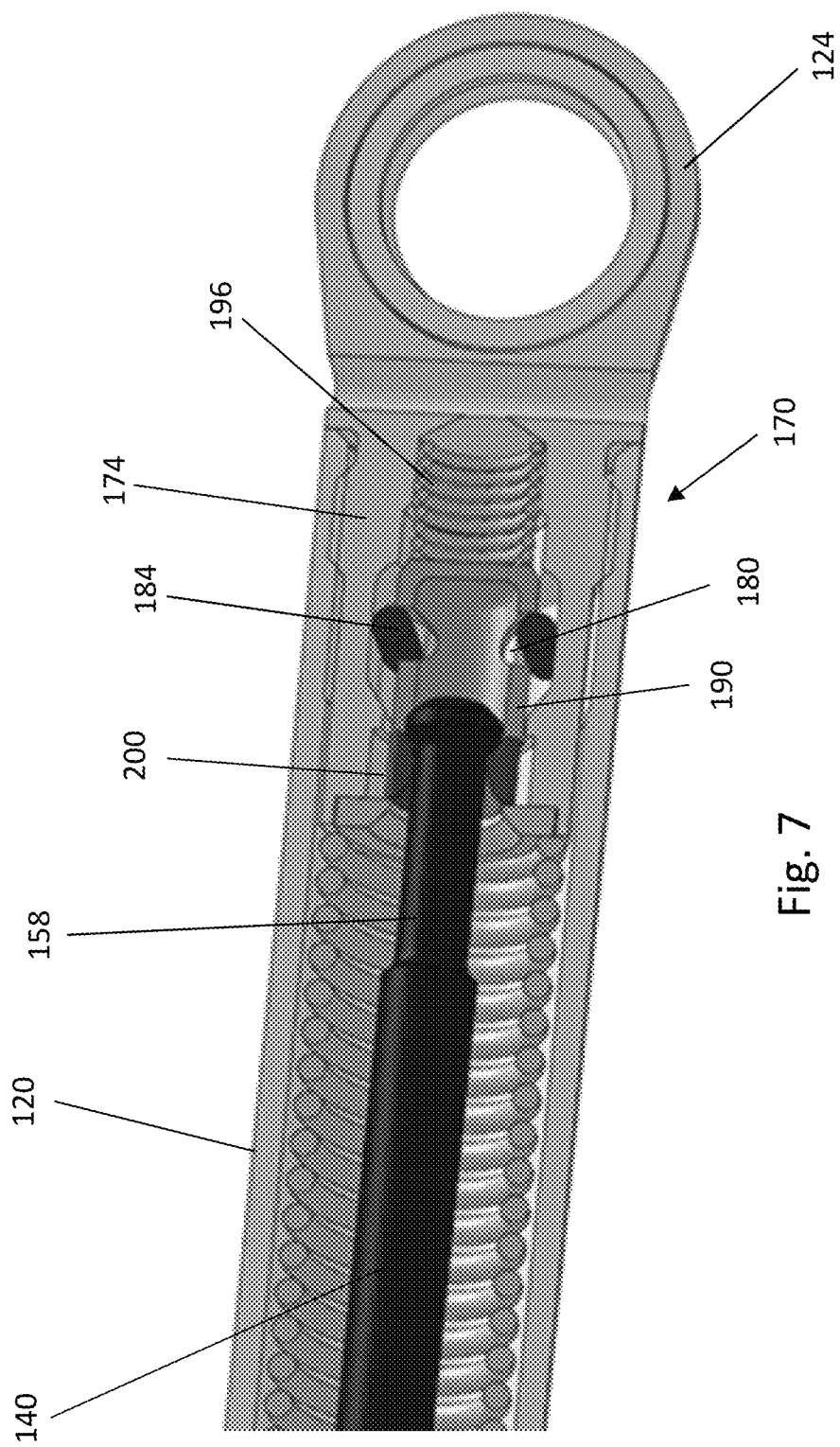

Due to the collapse of the retainer spring clips 200, the poppet retainer 190 is prevented from returning to its original biased and locked state. With reference to FIG. 7, the dowel pins 184 are retained in a position within the profiled slots 180 of the end cylinder body 174 that is displaced outwardly and away from the narrowed diametrical portion 158 of the spring retainer 140.

Figure 8:
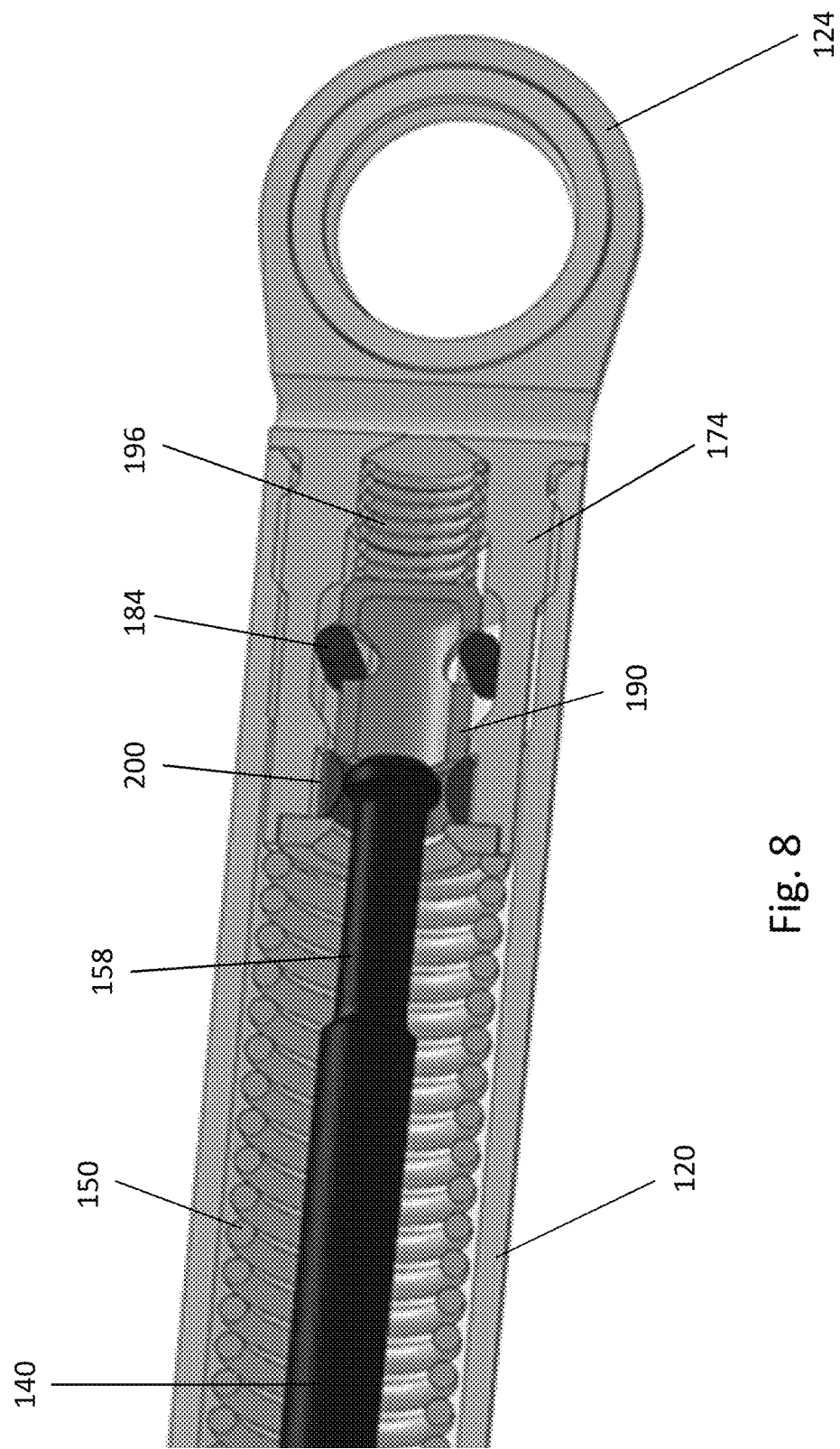

Referring sequentially to FIG. 8 and as the spring retainer 140 retracts from the latch mechanism 170, the shoulder at the distal end of the narrowed diametrical portion 158 of the spring retainer 140 makes contact with the tips of the collapsed retainer spring clips 200, thereby expanding the clips 200 outwardly in the recessed portion as the end of the spring retainer 140 passes and exits the latch mechanism 170. The spring biased poppet retainer 190 is now free to return to its initial spring locked state as aided by the poppet retaining spring 196, although this movement is too late to restrain the spring retainer 140 (and the internal spring force of the coil springs 150) at this point. The dowel pins 184 are also shifted within the profiled slots 180 due to the axial movement of the poppet retainer 190.

Figure 9:
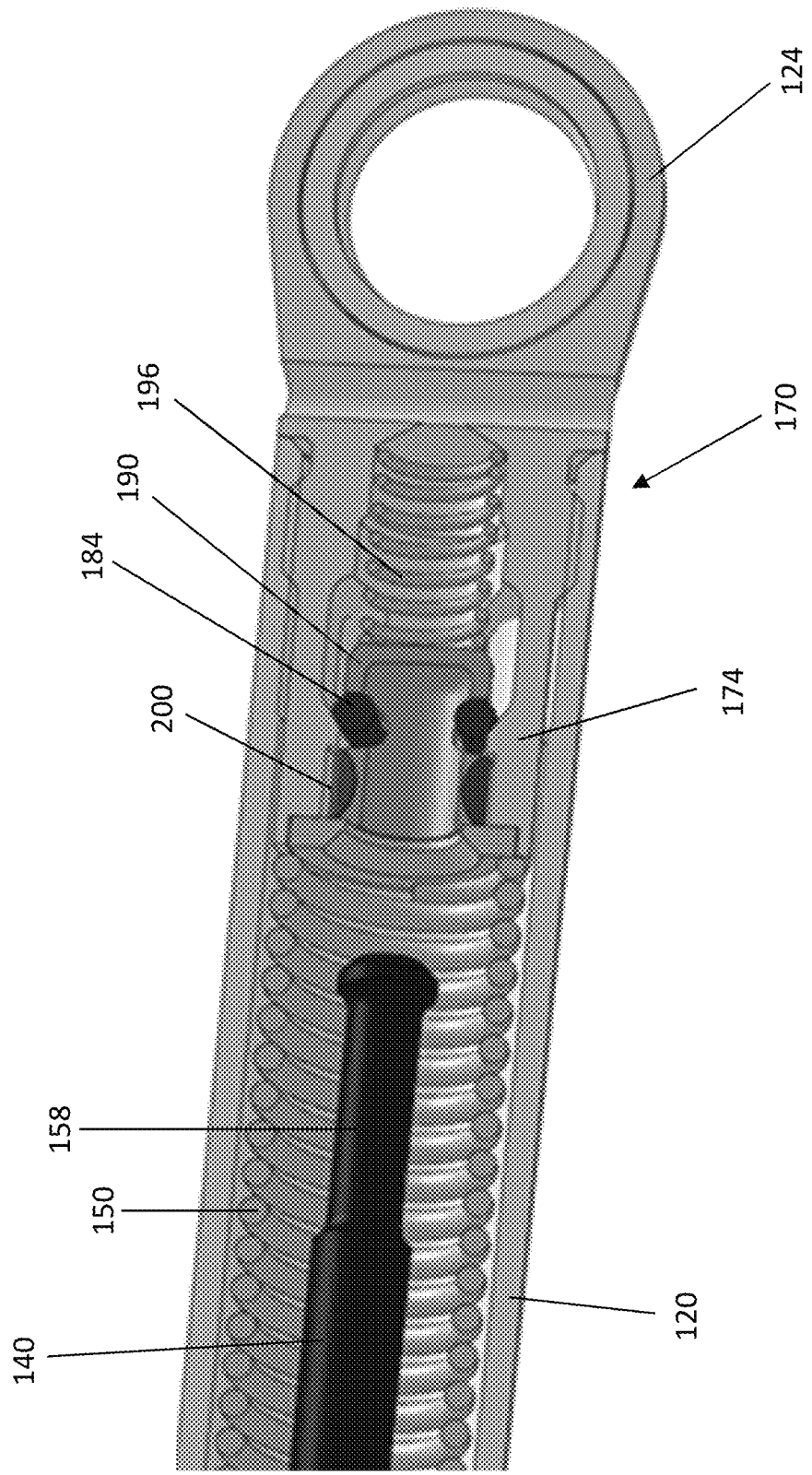

With reference to FIG. 9, the spring retainer 140 continues to exit the latch mechanism 170 and is now providing a lift assist force (for raising and closing the stowage bin, for example) due to the release of the coil springs 150 as the piston rod 132 and spring retainer 140 are each moved in an extending direction. In the meantime, the latch mechanism 170 has now reset and is ready to accept the spring retainer 140 and can further lock out the lift assist spring force, if needed. The foregoing is how the adaptive lift assist assembly according to this embodiment is able to reset itself during each cycle to ensure a default deactivated state; that is, for as long the load in the stowage bin exceeds the heavy load measurement spring. That is, the sequence of FIGS. 6, 7 and 8 would be repeated to unlatch the mechanism and apply the lift assist automatically as the stowage bin is moved between opened and closed positions, assuming that the requisite load needed to compress the measurement spring has been maintained.

Figure 10:
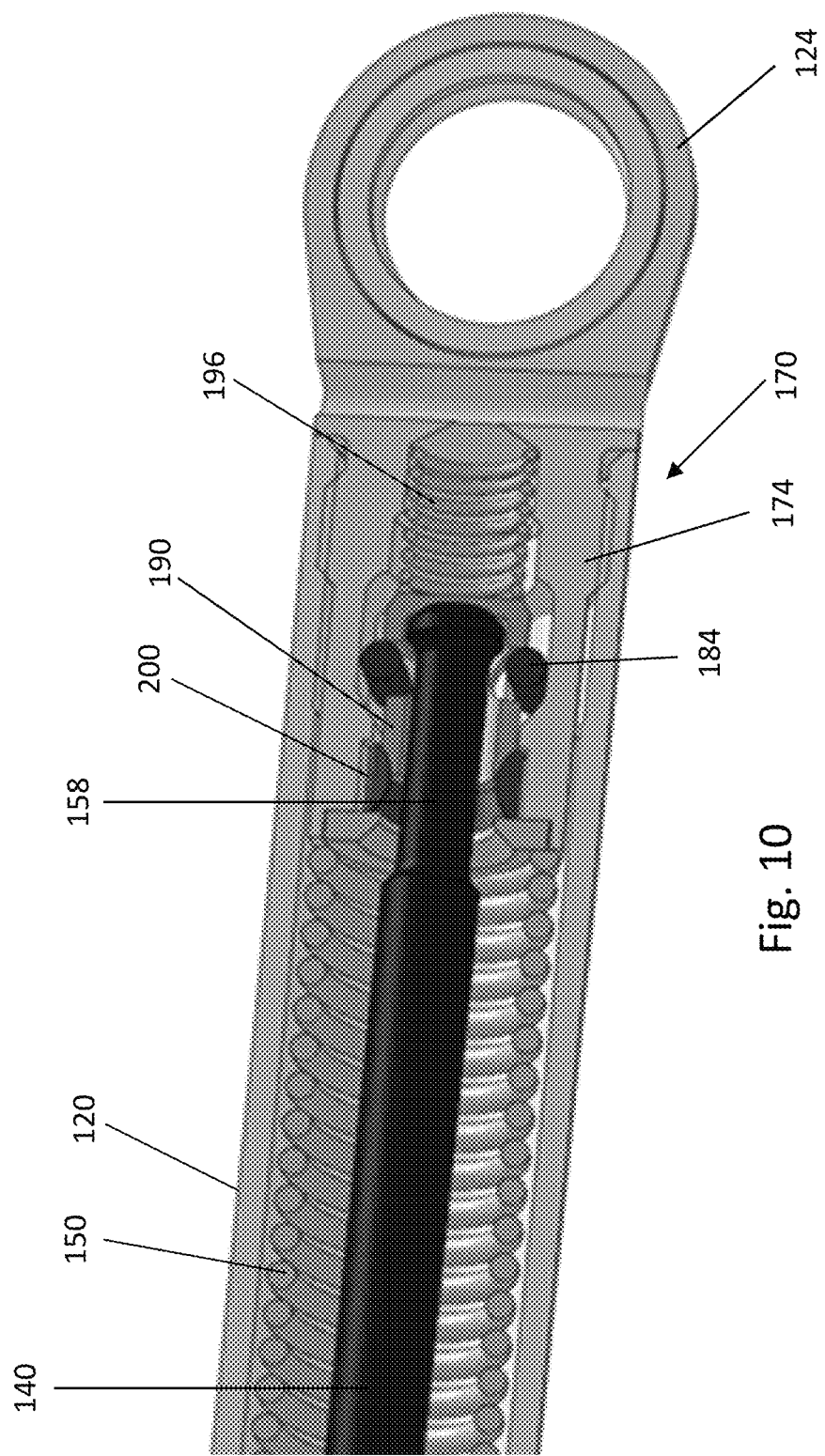

With reference to FIG. 10 and as the spring retainer 140 re-enters the latch mechanism 170 on the next cycle as the piston rod 132 is moved into the interior of the assembly housing 120, the spring retainer 140 once again depresses the poppet retainer 190 against the bias of the poppet retaining spring 196 and at least partially and sufficiently moves the dowel pins 184 into the profiled slots 180 of the end cylinder body 174 to permit the end of the spring retainer 140 to pass to the end of the poppet retainer 190.

Figure 11:
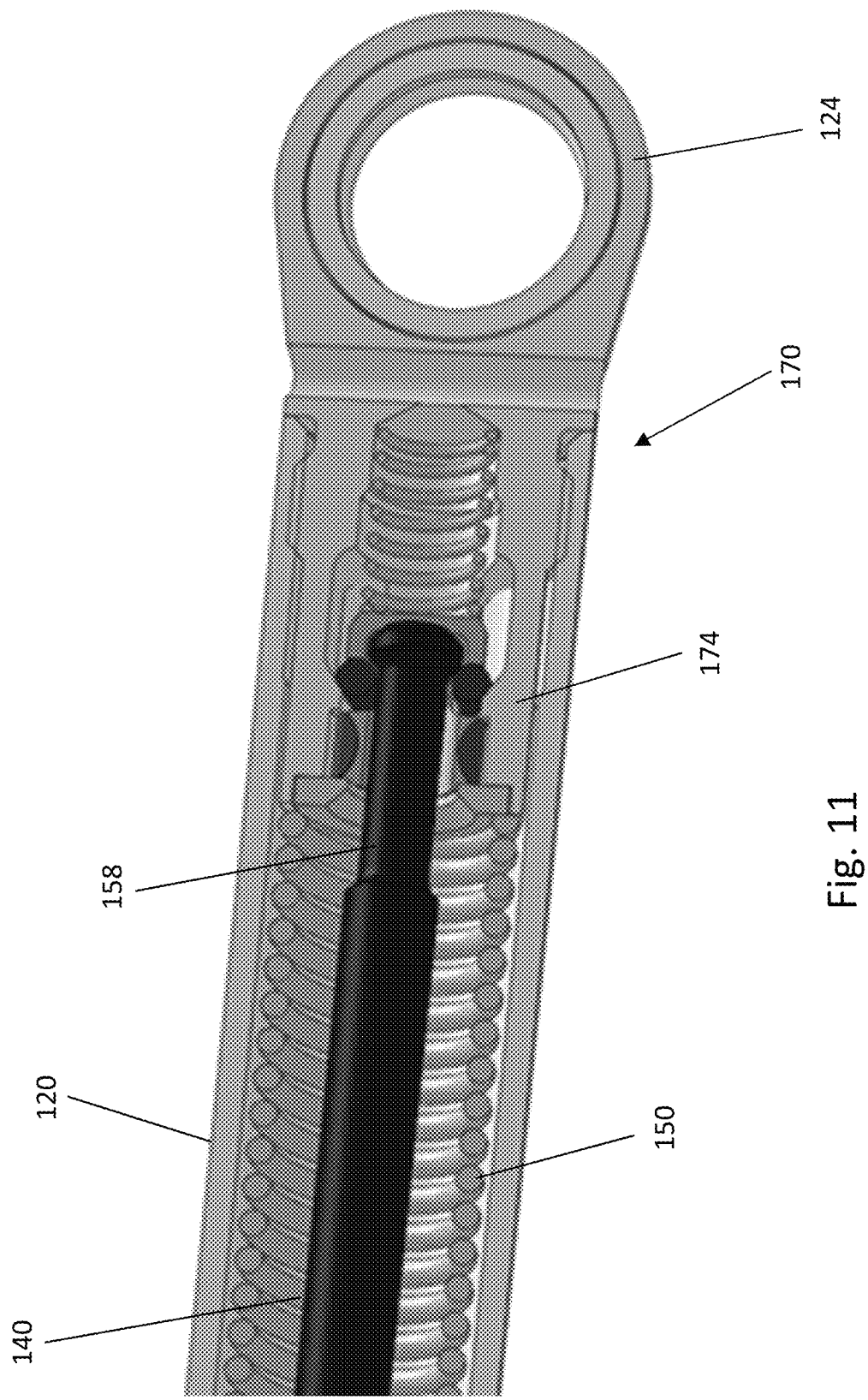

Finally and referring to FIG. 11 and when the weight within the stowage bin (not shown) is removed, the heavy load measurement spring 160 is no longer compressed when the piston rod 132 is advanced into the interior 136, FIG. 2(b), of the assembly housing 120. Therefore, the spring retainer 140 and the spring-biased poppet retainer 190 will once again return to their initial locked state, this time restraining the spring retainer 140 and locking the coil springs 150, thereby rendering the lift assist 100 deactivated or locked.

Figure 12:
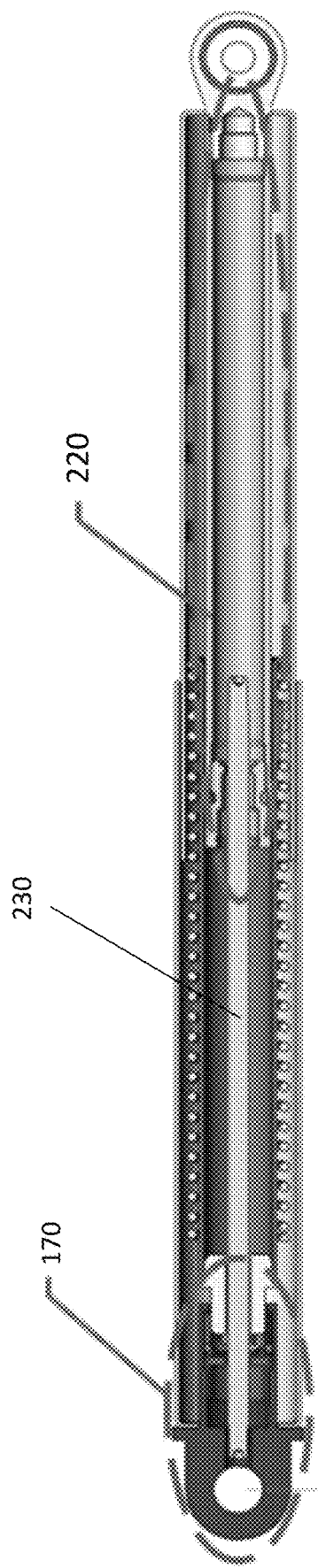
FIG. 12 is a sectional view of the load adaptive lift assist, including a hydraulic damping assembly.

Though not shown in the prior views for the sake of clarity, the assembly housing 120 can further retain a hydraulic damping assembly 220, as generally shown in an alternative embodiment according to FIG. 12 wherein the damping assembly is configured to provide damping as the piston rod 132 is moved in the compressed direction. A suitable damping assembly that can be utilized for this embodiment is described in greater detail with reference to FIG. 19.

Another embodiment of a load adaptive lift assist assembly 300 is herein depicted with reference to FIGS. 13-19. In brief, the lift assist is configured to function similarly to that described in the prior embodiment in which the lift assist assembly 300 is locked until a predetermined amount of force (weight) is added to an attached stowage bin. According to this embodiment, an assembly housing 320 is provided having a substantially cylindrical configuration that is further defined by a hollow interior 327, as well as a pair of respective end fittings 324, 328. More specifically, the assembly housing 320 is a cylindrical member having fitted therein a telescoping tubular section 325 that extends into the hollow interior 327 of the assembly housing 320. One of the end fittings 328 is fixedly attached to one end of the telescoping tubular section 325 and at least one coil spring 350 is disposed over the exterior of the extending portion of the telescoping tubular portion 325, the at least one coil spring 350 being secured in compression between a mounting surface of the end fitting 328 and an edge surface of the assembly housing 320. The number of coil (lift assist) springs that are used in the herein depicted assembly can be suitably varied.

As noted, the telescoping tubular portion 325 extends into the hollow interior 327 of the assembly housing 320 and is also defined by a hollow interior 329. The opposing end of the telescoping tubular portion 325 includes a cap 331 having a defined center opening that fixedly receives one end of a retaining tube 340.

According to this embodiment, a piston rod 330 is fixedly secured to the remaining end fitting 324, the piston rod 330 extending axially into the hollow interior 327 of the assembly housing 320 and intermediately into the hollow interior 329 through the defined center opening of the telescoping tubular section 325.

A latch mechanism 370 is fixedly disposed at one end of the assembly housing 320 adjacent the end fitting 324. The latch mechanism 370 according to this version includes a hollow body 374 having an interior that is sized and configured to retain a poppet retainer 390, the latter being biased by a poppet retaining spring 396 disposed between an end wall of the assembly housing 320 and the poppet retainer 390. The poppet retainer 390 is sized to receive an end of the retaining tube 340 through one open end of the latch mechanism body 374. According to this version, a flexible sleeve 346 is disposed in overlaying relation over an axial portion of the retaining tube 340, the latter having a recessed axial portion 342 adjacent the extending end of the retaining tube 340. According to this embodiment, a set of dowel pins 384 are further provided as part of the latch mechanism 370.

Unlike the prior embodiment and also as shown in the version according to FIG. 12, the piston rod 230, (FIG. 12), 330 is configured to extend through each of the components of the latch mechanism 370 (i.e., the poppet retaining spring 396, the poppet retainer 390 and end fitting body 374) as well as the retaining tube 340 and flexible sleeve 346 wherein the piston rod 330 further extends into the defined center opening and into the hollow interior of the telescoping tubular portion 325. More specifically, the piston rod 330 is freely moved between respective extended and contracted positions.

Figure 13:
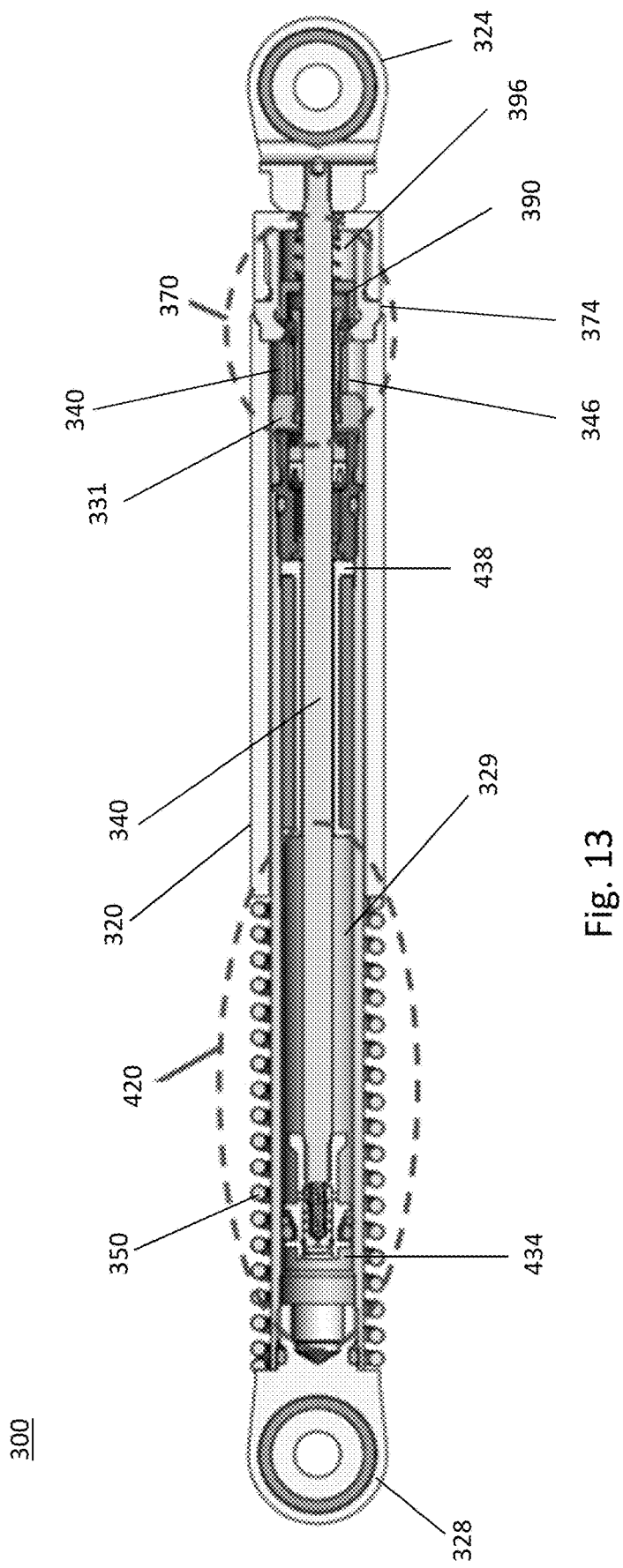
FIGS. 13-19 are partial sectioned views of a load adaptive lift assist assembly in accordance with another embodiment, and shown in operational sequence.
Figure 15:
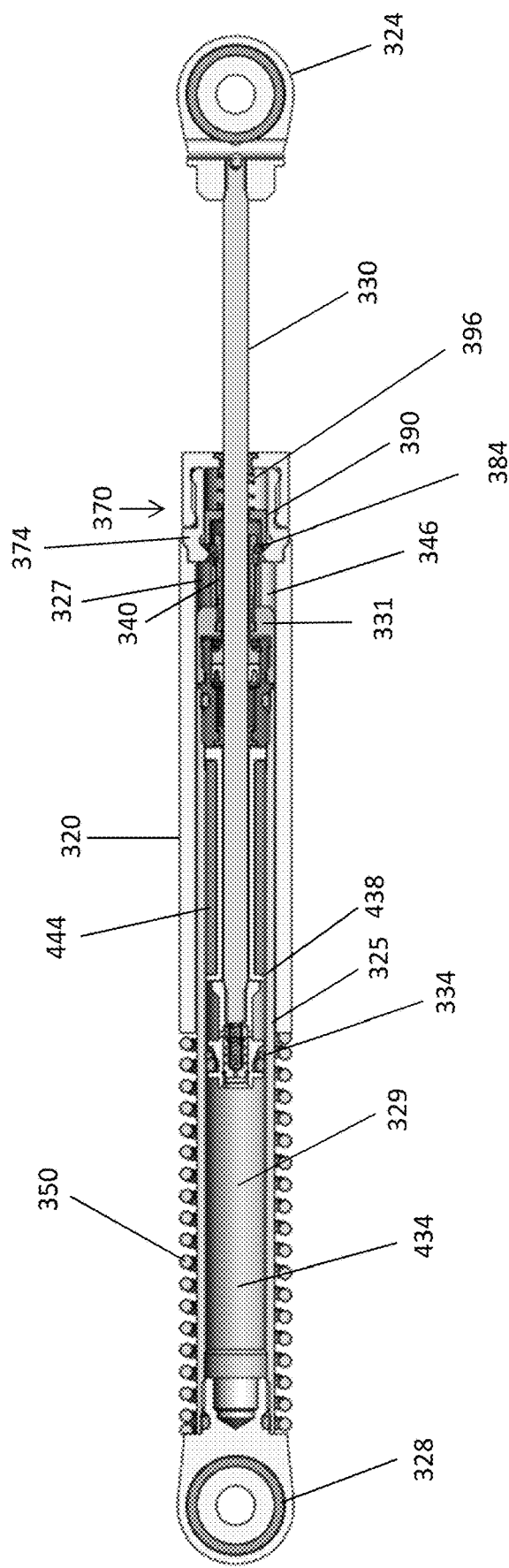
Figure 19:
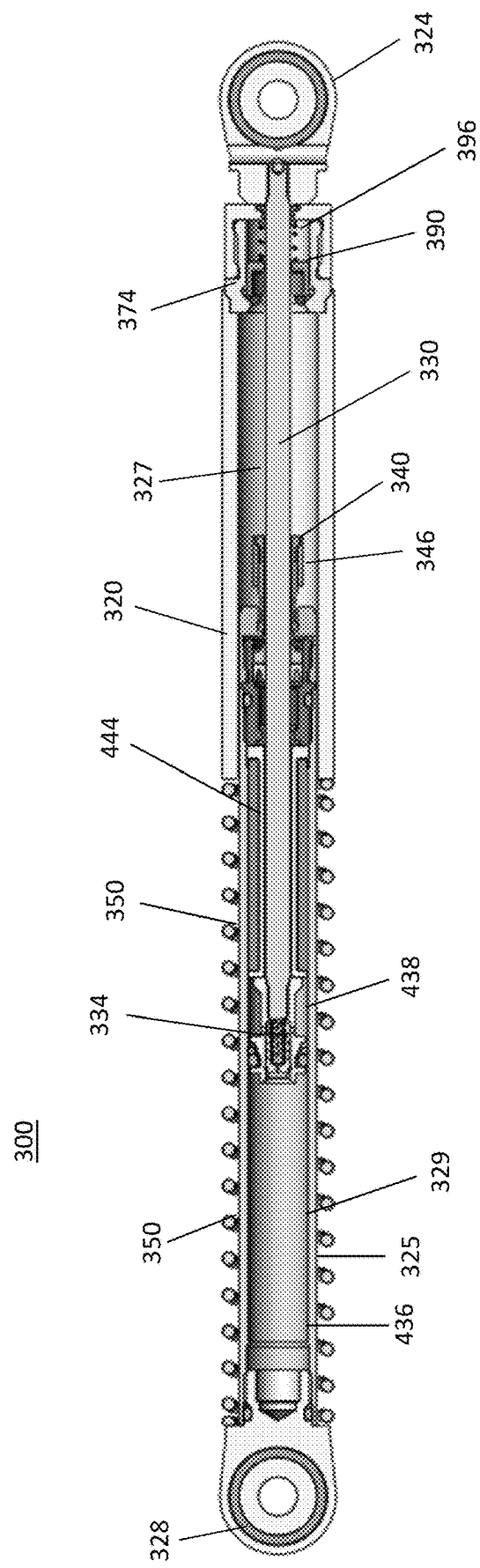

According to this embodiment, the telescoping tubular portion 325 further includes a hydraulic damping assembly 420, FIG. 13, in which a piston head 334 moves though a quantity of a hydraulic fluid between defined sealed hydraulic chambers 434 and 438 within the interior 329 of the telescoping tubular portion 325 through which the piston rod 330 and more specifically the piston head 334 moves in a compressed direction, as shown most clearly by FIGS. 13, 15 and 19. The latch mechanism 370 is isolated from the hydraulic damping assembly 420 by means of a bearing assembly 450 having appropriate fluidic seals. Comparable sealing is further provided in the section 325 adjacent the end fitting 328.

With the foregoing discussion, reference is made to FIGS. 13-19, which depict a sequential operation of the load adaptive lift assist assembly 300 in accordance with this specific embodiment. First and according to FIG. 13 and more particularly the enlarged end view of FIG. 14, the load adaptive lift assist assembly 300 is shown in a locked-out position in which the lift assist (spring 350) is not yet enabled. In this position, the telescoping tubular portion 325 is retained by the latch mechanism 370. More specifically, the dowel pins 384 are engaged within a slot formed in the latch mechanism body 374 and the recessed axial portion 342 formed in the retaining tube 340. In this position, the poppet retainer 390 is biased by the poppet retaining spring 396 and retains the dowel pins 384 in this position. Moreover and in this position, there is insufficient load to move the poppet retainer 390 against the bias of the poppet retaining spring 396 to effect release of the telescoping tubular portion 325 from the latch mechanism 370. More specifically, this positioning of the poppet retainer 390 causes the dowel pins 384 to restrain the retainer tube 340 which in turn, restrains movement of the telescoping tubular portion 325 and the end fitting 328 and therefore, the lift assist springs 350. Though the force of the lift assist spring 350 is locked out, the piston rod 330 is still allowed to freely extend and compress based on movement of the pivoting stowage bin (not shown). In addition, damping is provided in the compression direction, as shown most clearly according to FIG. 14 due to movement of the piston head 334 within the hydraulic damping assembly 420.

With reference to FIG. 15 and as the unit is further compressed (that is, greater weight is placed in the stowage bin (not shown)), the retaining tube 340 further axially engages the poppet retainer 390 in the axial direction and causes corresponding movement. A measurement spring or other suitable external means (not shown) can be suitably situated in the assembly housing 320, according to FIG. 3(a) or alternatively and according to this embodiment, the spring can be external to the assembly. In either instance, the additional axial movement of the retainer tube 340 due to load enables the flexible sleeve 346 to act upon and displace the dowel pins 384 away from the retainer tube 340 and over the flexible sleeve 346, which is more clearly shown in FIG. 16.

Figure 16:
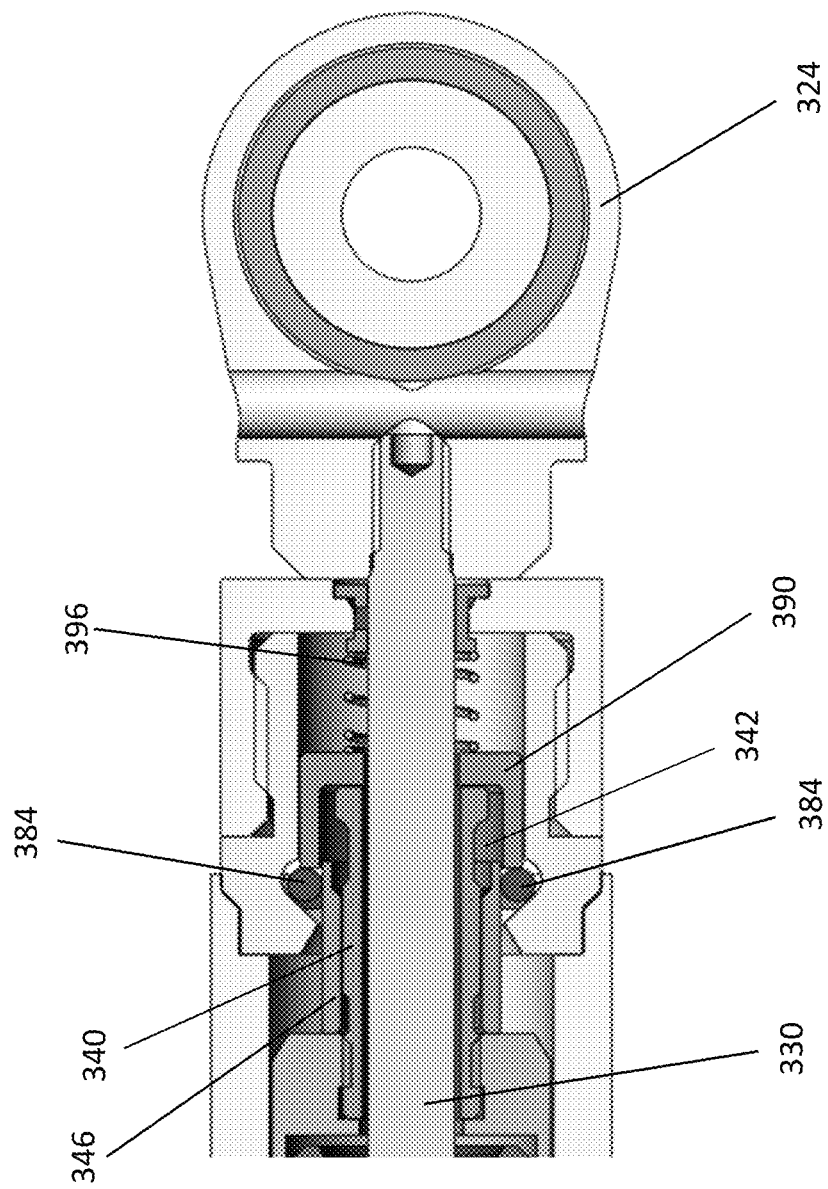

With reference to FIG. 16 and as the unit is then extended (the retaining tube 340 being moved in the opposing extended direction toward end fitting 328), the retaining spring 396 biases the poppet retainer 390 into engagement with the dowel pins 384 and causes the dowel pins 384 to temporarily restrain axial movement of the flexible sleeve 346. As such, the movement of the poppet retainer 390 to its original position is effectively delayed.

Figure 17:
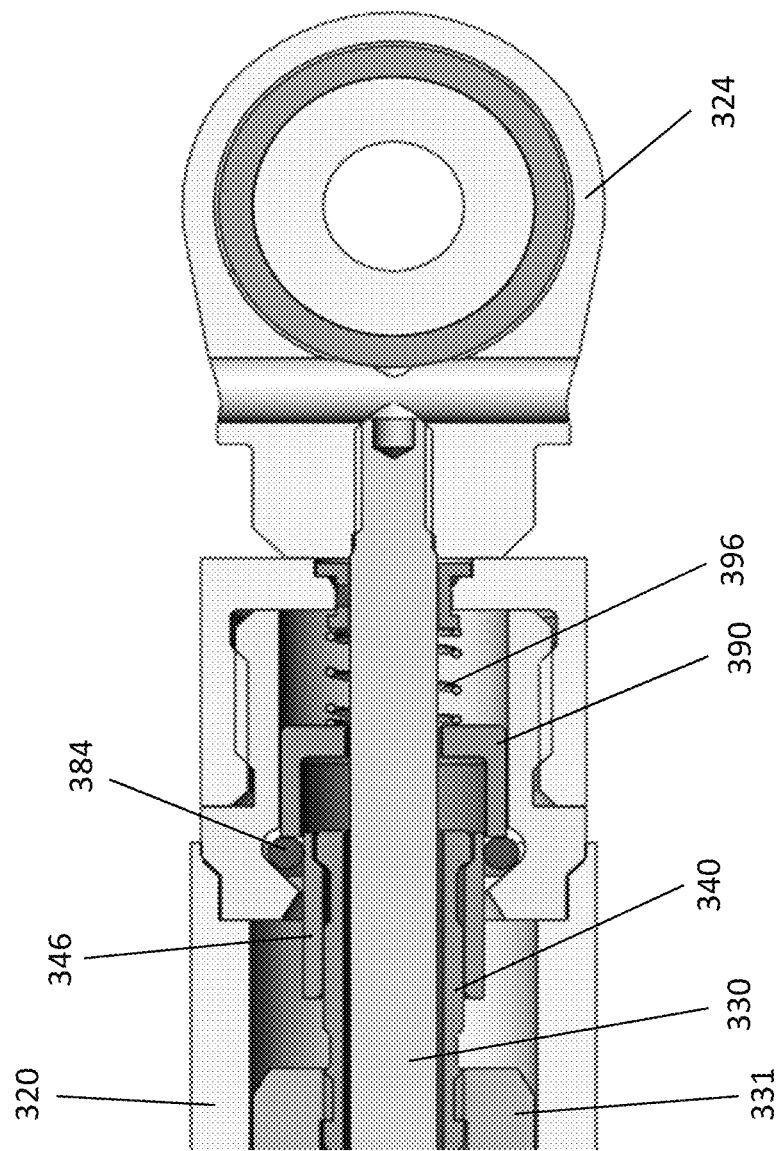

With the dowel pins 384 not involved in actively restraining the retainer tube 340, the retainer tube 340 extends into the sleeve 346, as shown in FIG. 17, pulling the flexible sleeve 346 and the telescoping tubular portion 325 away from the dowel pins 384, as the movement of the poppet retainer 390 to its original position remains delayed.

Figure 18:
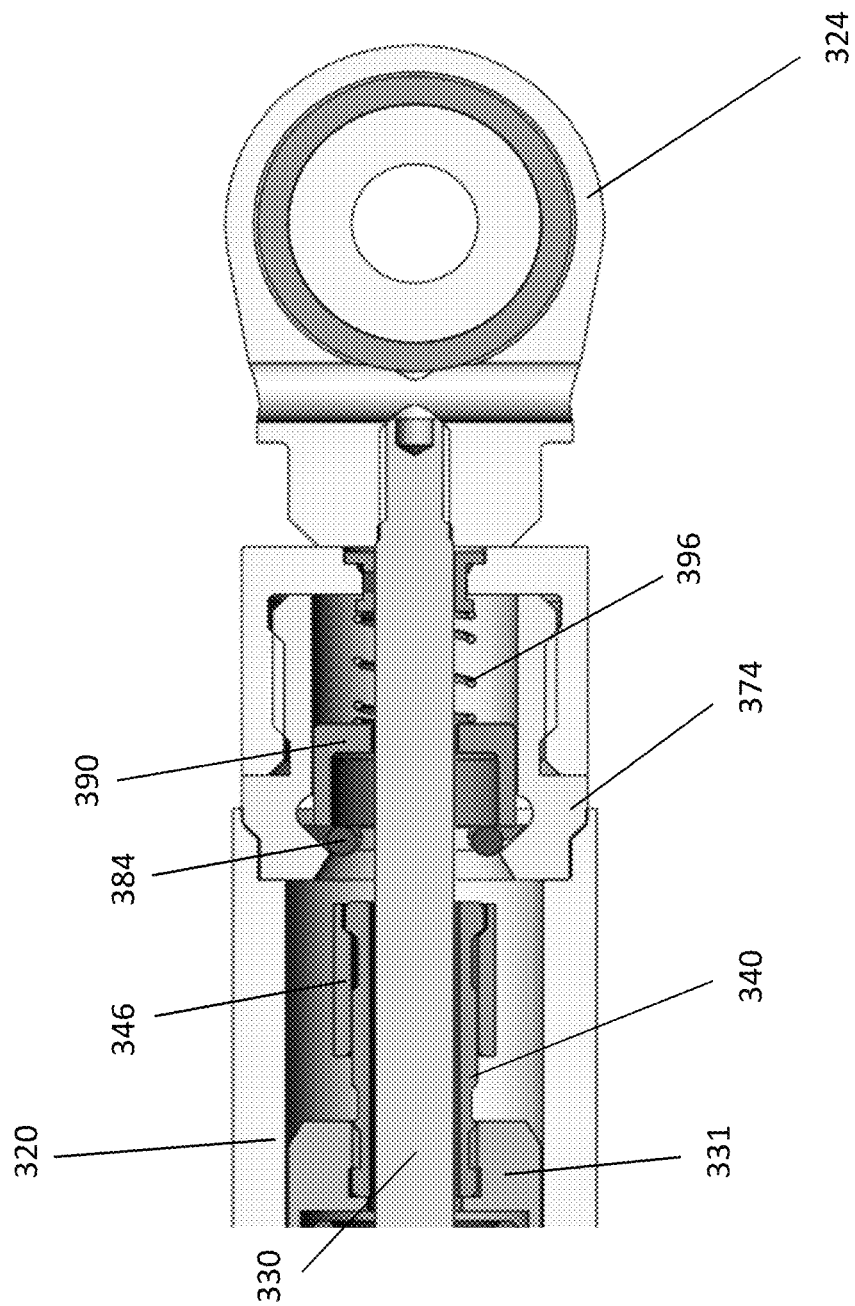

The release of the retaining tube 340 from the latch mechanism 370 is further depicted in FIG. 18. The telescoping tubular portion 325 is now free to move, thereby causing release of the lift assist spring 350 as fully extended according to FIG. 19. The poppet retainer 390 now reverts to its original position, further causing the dowel pins 384 to also be reset.

Figure 14:
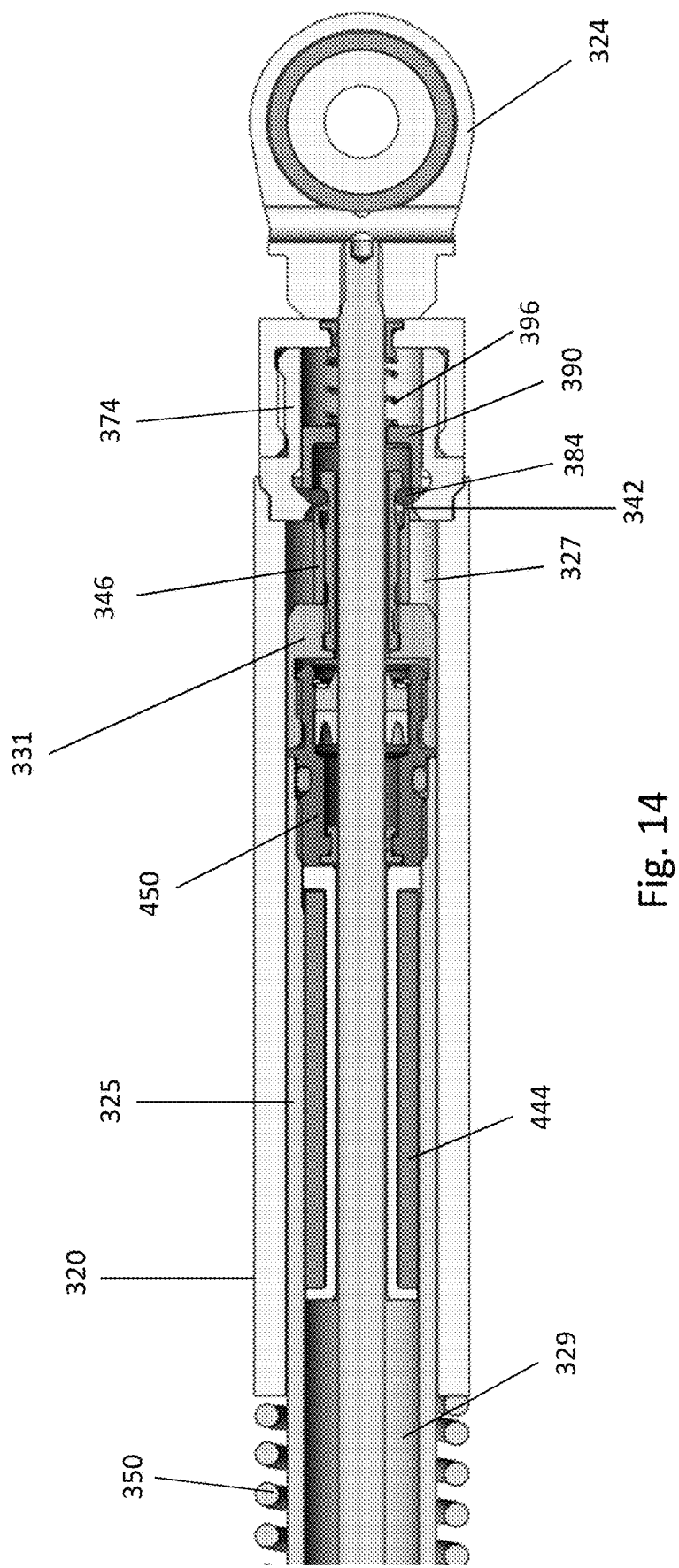

The load adaptive lift assist assembly 300 can be deactivated or locked again by compressing the unit to the unit locked length, previously shown in FIGS. 13 and 14. The foregoing movements occur automatically based on the load applied to the poppet retainer 390.

In summary and in each of the foregoing embodiments, a lift assist spring can be attached onto the exterior of a cylindrical body or assembly housing in which one end of the at least one load assist spring is attached to the assembly housing and the opposing end of the at least one load assist spring is attached to a retaining rod or tube. A latch mechanism is disposed at one end of the assembly housing and includes a housing that retains a poppet retainer, the latter being biased by a spring. The latch mechanism is configured to retain the retaining tube (and therefore the load assist springs) in a locked state until a predetermined force has been realized in terms of movement of the retaining tube. More specifically, one end of the biasing spring of the poppet retainer engages an inner wall of the assembly housing and the remaining end engages the poppet. A set of dowel pins are disposed within a corresponding series of profiled slots formed within a cylindrical body of the latch mechanism. The dowel pins are arranged to move within the profiled slots based on movement of the poppet within the latch mechanism. When the predetermined load has not been exceeded, the poppet retainer acts in concert with the retaining rod and prevents release. When the predetermined load has been exceeded, the movement of the poppet retainer is delayed due to additional movement of the dowel pins or other suitable feature of the latch mechanism.

As shown in FIGS. 13 and 19, the lift assist assembly 300 can further include the hydraulic damping apparatus 420 including a pair of sealed hydraulic chambers 434, 438 within the interior of the telescoping tubular portion 325 that can provide damping in the compressed direction as the piston rod 330 and more specifically the piston head 334 is advanced. The adjacent chambers 434, 438 are sealed wherein the piston head 334 preferably includes at least one orifice that is configured to move hydraulic fluid between the adjacent chambers. A fluid accumulator 440 is further provided in one of the sealed hydraulic chambers. This specific damping assembly is exemplary. It will be well understood that other suitable versions can be alternatively provided.

In addition, it will also be understood that other mechanical versions of the load adaptive lift assist can be contemplated that perform similar functions in which loads in the stowage bin that exceed a predetermined threshold can automatically engage the lift assist. For example and with reference to the versions depicted in FIGS. 20(*a*)-24, there are shown various embodiments of load adaptive lift assist assemblies that utilize cam members. According to at least one version and in lieu of having dowel pins that slide in profiled slots or the like as discussed in the prior embodiments, balls or pins can be provided within a slidable sleeve member.

Figure 20A:
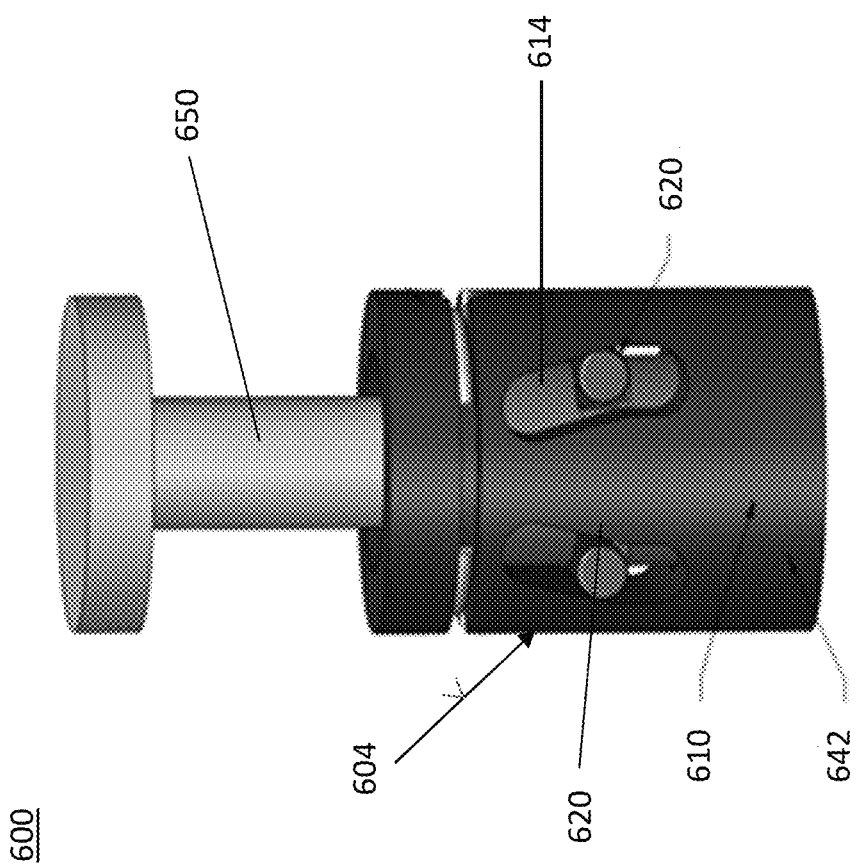
FIG. 20(a) depicts a latch mechanism for a load adaptive lift assist made in accordance with another embodiment.
Figure 20B:
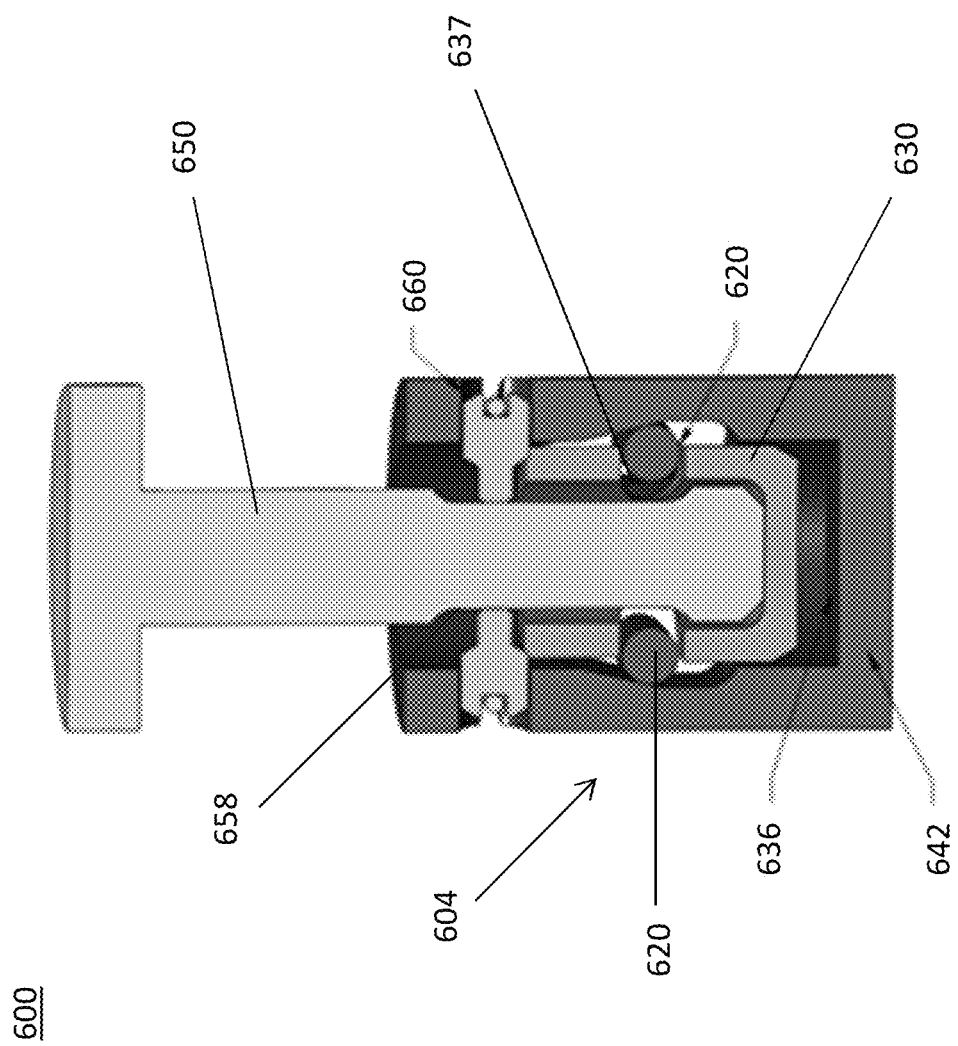
FIG. 20(b) is a sectioned view of the latch mechanism of FIG. 20(a)

With reference to FIGS. 20(*a*) and 20(*b*), there is depicted an end portion of a load adaptive lift assist assembly 600 in accordance with another embodiment. According to this version, a latch mechanism 604 is defined by a housing or body 610 having a cylindrical configuration wherein a set of dowel pins 620 are disposed within corresponding slots 614 formed on the latch mechanism body 610. As in the prior described embodiments, a poppet retainer 630 disposed within the latch mechanism body 610 is sized and configured to receive the end of a retainer rod 650, wherein the retainer rod 650 includes a narrowed diametrical or grooved portion 658 adjacent the end thereof. The poppet retainer 630 also includes a set of intermediate slots 637, wherein the poppet retainer 630 is biased by a retaining spring (not shown) disposed in location 636. According to this embodiment and adjacent the retaining spring, a separate load measurement spring (not shown) disposed in location 642 and having a stiffness that is significantly greater than the poppet retaining spring is further disposed. In lieu of retainer spring clips 200, FIG. 4, as provided in the first described embodiment, a switch pin 660 is provided, the switch pin 660 being retained by a C-clip (or other spring loading means) in a housing groove for radial movement relative to the retainer rod 650. As in the preceding, the retainer rod 650 is attached to a structure (not shown) that retains at least one lift assist spring (not shown). In a locked or inactive state, the retaining rod 650 is restrained from axial movement by the latch mechanism 604. When compressed, the retainer rod 650 engages the poppet retainer 630 against the bias of the poppet retaining spring. This movement is insufficient to unlock the retaining rod 650, as the dowel pins 620 and the switch pin 660 prevents the retaining rod 650 from release.

However, and when a greater compressive force is provided by the retainer rod 650 against the bias of the stiffer load measurement spring, the dowel pins 620 are caused to move within the slots 614 over the poppet retainer 630 with the spring loaded switch pin 660 being caused to move out of the narrowed diametrical portion 658 and onto the wider diameter of the retaining rod 650. When the retaining rod 650 is then retracted, the position of the dowel pins 620 delays the reset of the poppet retainer 630 and permits the retaining rod 650 to be released from the latch mechanism 604, thereby releasing the lift assist spring (not shown).

It should be noted that other alternative design configurations can be contemplated for providing the same functionality to automatically provide a lift assist once a predetermined load has been exceeded. For example and with reference to FIGS. 21(*a*)-24, two (2) load adaptive lift assemblies are depicted having respective latch mechanisms 704 and 904. As discussed below, the latch mechanism 704 according to FIGS. 21 and 23 utilizes a camming member 708 that is caused to rotate based on movement of camming pins 705 within corresponding angled (profiled) slots as illustrated that each employ rotating camming features such as pins and hooks, FIGS. 21(*a*), (*b*) and 23.

According to the embodiment shown in FIGS. 21(a), (b) and 23, a plurality of pins 705 extend from a retainer rod 701, pass through profiled openings 706 in the camming member 708, and into linear slots 702 that are formed in a latch mechanism body 704. The linear slots 702 permit only linear travel of the retainer rod 701 with no rotation. A lower camming piece 709 slides within a cylindrical bore formed in the latch mechanism body 704, the lower camming piece 709 having linear slots 710 which are engaged with corresponding linear rails 711 formed and extending radially inwards from the inner surface of the cylindrical bore in the latch mechanism body 704. These slots and rails 710, 711 also enable linear travel of the lower camming piece 709 with no rotation.

Figure 23:
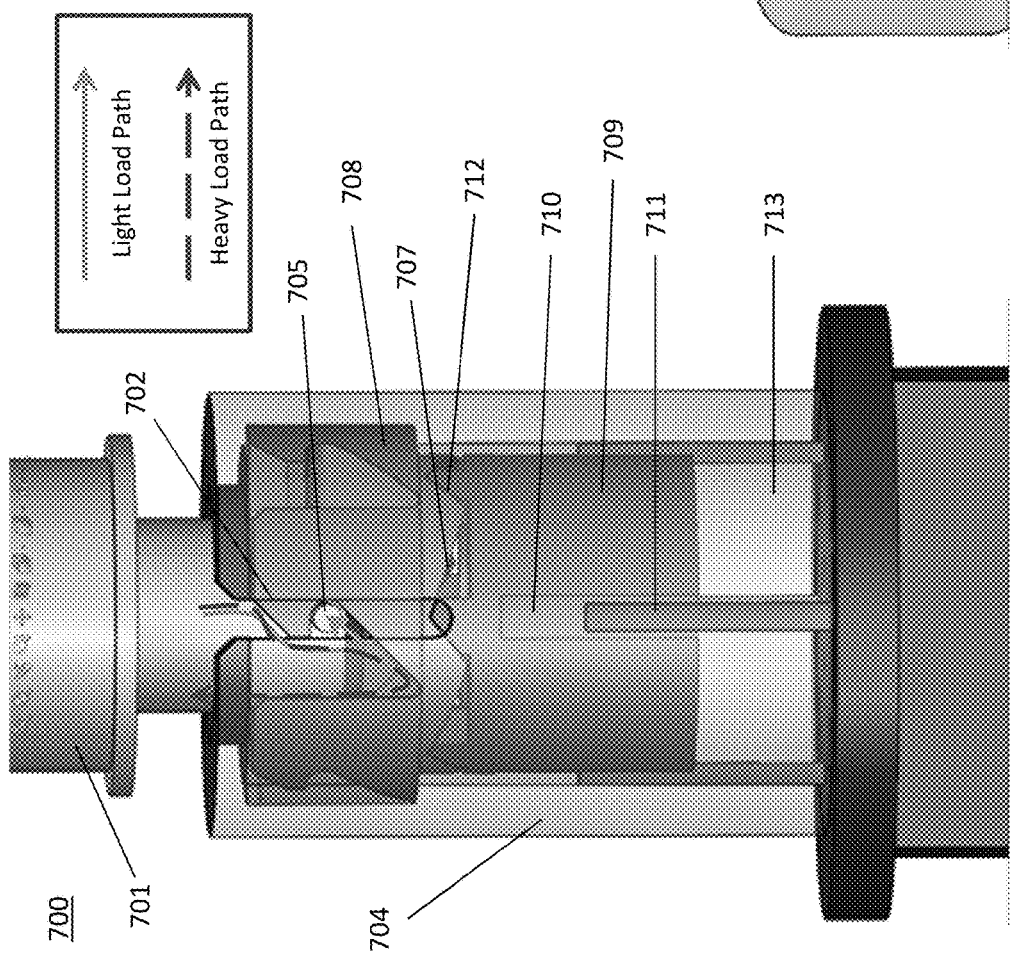

The camming member 708 and the lower camming piece 709 both have angled mating surfaces 707 and 712, respectively, which under the bias load of a retaining spring (not shown but which would be provided within the cavity 713) act to rotate the camming member 708 into one preferred clocking position or the next, depending on the amount of displacement of the pins 705 and due to the camming action of the pins 705 within the profiled openings 706 in a camming member 708. In this assembly, a light load path is assumed in which the camming member 708 rotates partially towards the next index/clocking position while the pins 705 and the lower adjacent camming piece 709 are each caused to translate axially. As shown in FIG. 23 and when the stowage bin is empty or lightly loaded and moved toward the closed position, the camming member 708 rotates such that the pins 705 follow a path within the profiled openings 706 in the rotating camming member 708 like that labeled "Light Load Path". This movement is insufficient to cause the rotating camming member 708 to rotate into the next index/clocking position. Therefore, the camming surfaces, under the bias load of the retaining spring, forces the camming member 708 to its original or starting position. In this condition, the lift assist force is deactivated.

When a heavier load is encountered, the pins 705 translate further along the linear slots 702 formed in the latch mechanism body 704 and cause the camming member 708 to rotate further toward the next index/clocking position until the "crest" of the angled mating surface 707 of angled mating surface 712 formed in the lower camming piece 709, each under the bias load of the retaining spring, then acts to rotate the camming member 708 into the next clocking position. In this latter case, the pins 705 would trace a path within the profiled openings 706 in the camming member 708 like that labeled "Heavy Load Path" and the lift assist force is now activated in order to provide a lift assist to the individual closing the bin.

Figure 22:
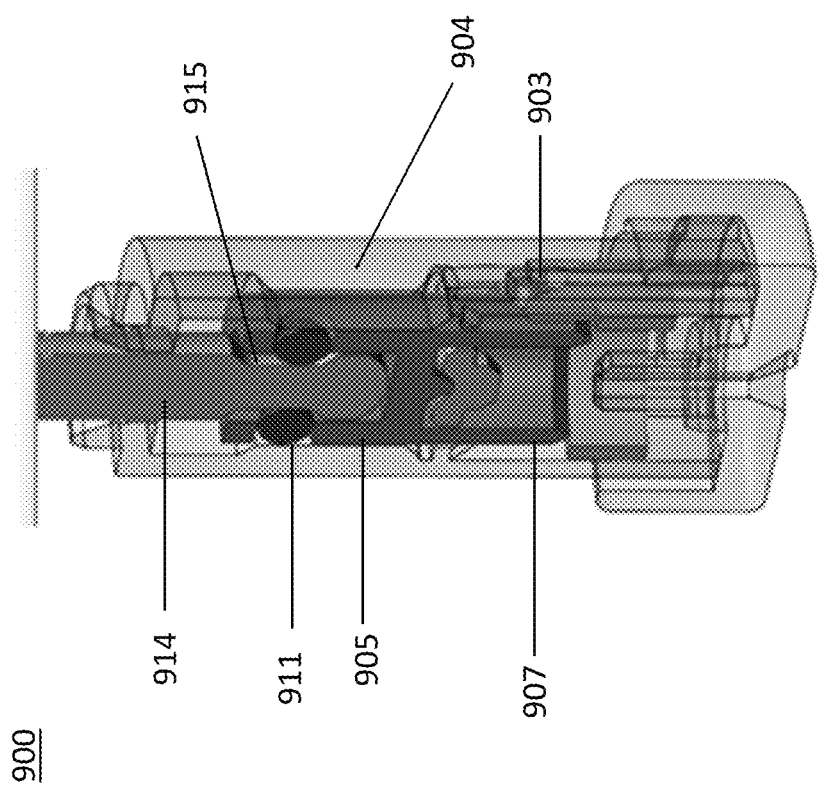
Figure 24:
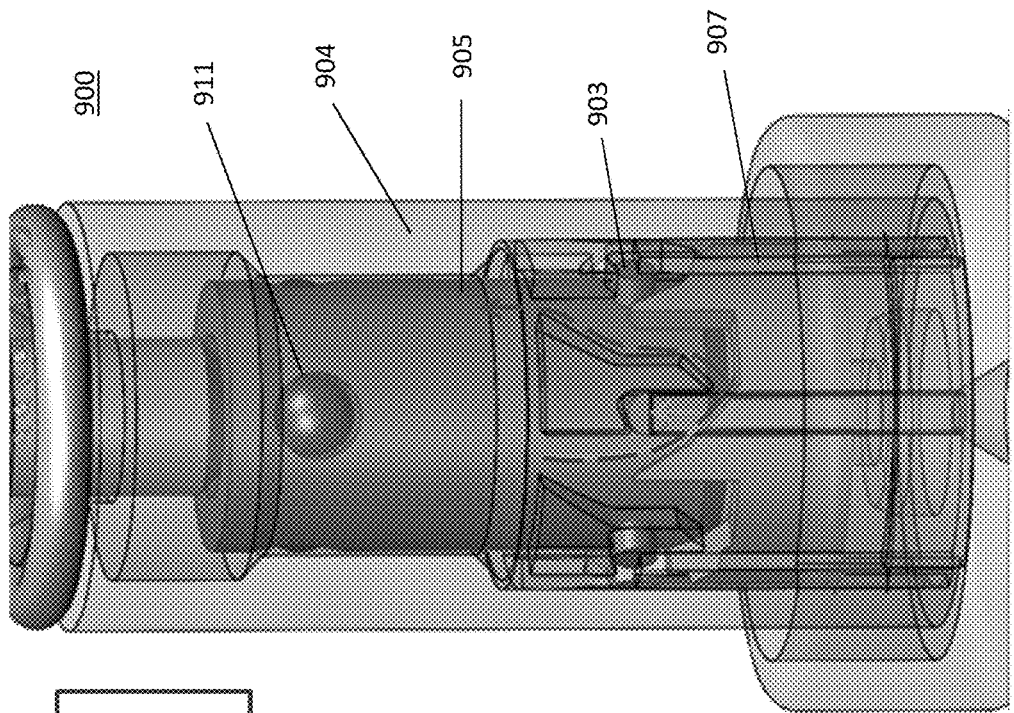
FIGS. 23 and 24 are enlarged sectioned views of the load adaptive lift assist assemblies of FIGS. 21(a) and (b) and 22, respectively, depicting separate camming paths based on applied loads.

In the lift assist assembly according to FIGS. 22 and 24, pins 903 are formed in, and extend outward from an upper cam feature 905. The upper cam feature 905, according to this embodiment, is permitted to translate and also rotate while a corresponding lower cam piece 907 translates axially only. The upper cam piece 905 retains a plurality of balls 911 which are configured to move radially inward and outward to retain or release a spring retainer rod 914. These balls 911 may engage a narrowed diametrical portion of a spring retainer rod 914 in order to lock-out the lift assist spring force. As in the prior embodiment of FIGS. 21(a), (b) and 23, the pins 903 may follow either a "Light Load Path" or "Heavy Load Path" around a profiled shape, formed in the latch mechanism body 904. Depending on the path that is followed in response to the amount of displacement of the upper cam feature 905, the upper cam feature 905 may be held in a partially depressed position (lift assist deactivated) or may be driven by the bias load of a first retaining spring (not shown) disposed in location 919 back to the position in which the lift assist is activated. A second retaining spring (not shown) but disposed in location 921 provides a bias force to the lower cam piece 907. This second retaining spring may also provide a differentiating force to distinguish between light and heavy bin loads.

As noted previously and in this embodiment, the retainer rod 914 is restrained by the plurality of balls 911 that may engage the narrowed diametrical portion of the spring retainer rod 914 in order to lock-out the lift assist spring force. When the upper cam feature 905 is held in the partially depressed state by the pins 903 engaging the profiled shape features formed in the latch mechanism body 904, the balls 911 are positioned in a reduced diametrical portion of the body cavity that prevents the balls 911 from moving outward and away from a narrowed diametrical portion 915 of the spring retainer rod 914, thus locking-out the lift assist spring force.

Alternatively and if the upper cam feature 905 is depressed further, the lower cam feature 907 engages the pins 903 which cause the upper cam feature 905 to rotate until the pins 903 are oriented around the profiled shape features formed in the latch mechanism body 904 to follow a path identified as the "Heavy Load Path". In this condition and as the stowage bin (not shown) is closed, the upper cam feature 905 is moved by the retaining spring to an area where the balls 911 are now positioned in an enlarged diameter region of the body cavity that allows the balls 911 to move outward and away from the narrowed diametrical portion 915 of the spring retainer rod 914, thus unlocking the lift assist spring force.

PARTS LIST FOR FIGS. 1-24

20 stowage bin assembly
24 pivoting bin bucket
28 fixed compartment wall
31 latch
32 interior compartment
100 assembly, load adaptive lift assist
120 assembly housing
124 end fitting, cylindrical body
128 end fitting
132 piston rod
133 end, piston rod
135 bearing assembly
136 hollow interior, cylindrical body
137 end, piston rod
140 spring retainer
142 cap
145 shoulder
146 end, spring retainer
148 end, spring retainer
150 coil spring(s)
154 retainer
158 narrowed diametrical portion
170 latch mechanism
174 end cylinder body
177 inner cavity
180 profiled slots, end cylinder body
184 dowel pins
190 poppet retainer
196 poppet retainer spring
200 retainer spring clips
220 hydraulic damping assembly
230 piston rod 300 adaptive load assist assembly
320 assembly housing
324 end fitting
325 telescoping tubular portion
327 hollow interior, assembly housing
328 end fitting
329 hollow interior, telescoping tubular portion
330 piston rod
331 cap
334 piston head
340 retaining tube
342 recessed axial portion
346 sleeve, flexible
350 coil spring (lift assist)
370 latch mechanism
374 body, latch mechanism
380 slots, profiled
384 dowel pins
390 poppet retainer
396 poppet retaining spring
420 hydraulic damping assembly
434 hydraulic chamber
438 hydraulic chamber
444 fluid accumulator
450 bearing assembly
600 load adaptive lift assist assembly
604 latch mechanism
610 latch mechanism body or housing
614 slots, latch mechanism body
620 dowel pins
630 poppet retainer
636 location, poppet retaining spring
637 slots, retainer
642 location, load measurement spring
650 retainer rod
658 narrowed diametrical or grooved portion
660 switch pins
700 load adaptive lift assist assembly
701 retainer rod
702 slots
704 latch mechanism body
705 pins
707 angled mating surface
708 camming member
709 lower camming piece
710 linear slots
711 linear rails
712 angled mating surface
713 cavity
900 load adaptive lift assist assembly
903 pins
904 latch mechanism body
905 upper cam feature
907 lower cam piece
911 balls
914 spring retainer rod
915 narrowed diametrical portion
919 location, first retaining spring
921 location, second retaining spring Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. For example and though the at least one lift assist spring according to each described embodiment is a compression spring, it is contemplated that other mechanical (e.g., tension) or other suitable forms of springs (e.g., gas-powered springs) could be substituted for purposes of this invention. Moreover, although specific terms are employed herein, as well as in the claims which follow, they are used only in a generic and descriptive sense, and not for the purposes of limiting the present disclosure, nor the claims which follow.

The invention claimed is:

1. A load adaptive lift assist assembly for a pivoting stowage bin, the assembly comprising:
   a. an assembly housing having an interior and a pair of opposing end fittings;
   b. a piston rod disposed within the interior of the housing and operatively coupled to a first one of the pair of opposing end fittings, the piston rod configured to move between extended and retracted positions based on the movement of the stowage bin;
   c. a tubular section disposed within the interior of the assembly housing and about the piston rod, the tubular section being secured to the first one of the pair of opposing end fittings and coupled to at least one lift assist spring disposed about an axial portion of the tubular section; and
   d. a latch mechanism including at least one feature configured for retaining one end of the tubular section until a predetermined load has been exceeded in the stowage bin, the latch mechanism comprising:
      a hollow body disposed in the interior of the assembly housing adjacent a second one of the pair of opposing end fittings, the body including the at least one feature retaining the one end of the tubular section;
      a poppet retainer disposed within the hollow body and biased by a poppet retainer spring, the one end of the tubular section being axially movable within the hollow body of the latch mechanism to engage the poppet retainer against the bias of the poppet retainer spring when the predetermined load in the stowage bin has been exceeded, wherein axial movement of the poppet retainer against the bias of the poppet retainer spring disengages the at least one feature retaining the one end of the tubular section, thereby releasing the tubular section from the latch mechanism, including the at least one load assist spring.

2. The load adaptive lift assist assembly as recited in claim 1, including a load measurement spring that is deflected only when the predetermined load has been received in the pivoting stowage bin, and in which the deflection of the load measurement spring causes the latch mechanism to release the tubular section and the at least one lift assist spring.

3. The load adaptive lift assist assembly as recited in claim 2, in which the latch mechanism automatically latches and remains in a latched state that prevents release of the at least one lift assist spring until the load measurement spring is deflected due to the predetermined load.

4. The load adaptive lift assist assembly as recited in claim 3, in which the latch mechanism automatically remains unlatched until the load measurement spring is no longer deflected.

5. The load adaptive lift assist assembly as recited in claim 4, wherein the piston rod is configured to move between the extended and retracted positions irrespective of the state of the tubular section relative to the latch mechanism.

6. The load adaptive lift assist assembly as recited in claim 1, wherein the latch mechanism body is cylindrical and has slots, the latch mechanism further including pins that are disposed in the slots and in which axial movement of the poppet retainer causes the pins to move within the slots.

7. The load adaptive lift assist assembly as recited in claim 6, wherein the tubular section includes a narrowed diametrical portion adjacent the end extending into the latch mechanism.

8. The load adaptive lift assist assembly as recited in claim 7, including a set of spring clips or spring loaded pins within a recessed portion of the cylindrical body of the latch mechanism, the spring clips or spring loaded pins being movable radially within the recessed portion based on movement of the tubular section, the pins and the poppet retainer.

9. The load adaptive lift assist assembly as recited in claim 7, including a flexible sleeve disposed over at least an axial portion of the tubular section, the flexible sleeve being axially movable thereon.

10. The load adaptive lift assist assembly as recited in claim 5, wherein the assembly housing further retains a hydraulic damping assembly for damping movement of the piston rod.

11. The load adaptive lift assist assembly as recited in claim 4, wherein the latch mechanism body has a defined cavity and a set of movable balls disposed within an inner cavity of the body that are configured to move to a first position in which the latch mechanism retains the spring retainer and a second position under increased load that deflects the load measurement spring, the second position enabling release of the spring retainer.

12. The load adaptive lift assist assembly as recited in claim 4, in which the latch mechanism includes first and second camming members, one of the camming members including pins configured to move within defined slots formed in a latch mechanism body and at least one of the first and second camming members based on the load in the pivoting stowage bin.

13. The load adaptive lift assist assembly as recited in claim 12, in which one of the first and second camming members is configured to rotate at least partially after the predetermined load has been placed in the pivoting bin, wherein the rotation of the camming member creates different cam slot paths in which the slot paths followed determines the state of the at least one lift assist spring.

14. A pivoting bin assembly comprising a bin bucket and at least one load adaptive lift assist assembly, the load adaptive lift assist assembly comprising:
   a. an assembly housing having an interior and a pair of opposing end fittings;
   b. a piston rod disposed within the housing and operatively coupled to a first one of the pair of the opposing end fittings, the piston rod configured to move between extended and retracted positions based on the movement of the pivoting stowage bin;
   c. a tubular section disposed within the interior of the assembly housing and about the piston rod, the tubular section being secured to the first one of the pair of opposing end fittings and coupled to at least one lift assist spring disposed about an axial portion of the tubular section; and
   d. a latch mechanism including at least one feature for retaining one end of the spring retainer until a predetermined load has been exceeded in the stowage bin, the latch mechanism comprising:
      a hollow body disposed in the interior of the assembly housing adjacent a second one of the pair of opposing end fittings, the body including the at least one feature retaining the one end of the tubular section within the hollow body;
      a poppet retainer disposed within the hollow body and biased by a poppet retainer spring, the one end of the tubular section being axially movable within the hollow body of the latch mechanism to engage the poppet retainer against the bias of the poppet retainer spring when the predetermined load in the stowage bin has been exceeded, wherein axial movement of the poppet retainer against the bias of the poppet retainer spring disengages the at least one feature retaining the one end of the tubular section, thereby releasing the spring retainer from the latch mechanism including the at least one load assist spring.

15. The pivoting bin assembly as recited in claim 14, including a load measurement spring that is deflected only when the predetermined load has been received in the pivoting stowage bin, and in which the deflection of the load measurement spring causes the latch mechanism to release the tubular section and the at least one lift assist spring.

16. The pivoting bin assembly as recited in claim 15, in which the latch mechanism automatically latches and remains in a latched state that prevents release of the at least one lift assist spring until the load measurement spring is deflected due to the predetermined load.

17. The pivoting bin assembly as recited in claim 16, in which the latch mechanism automatically remains unlatched until the load measurement spring is no longer deflected.

18. The pivoting bin assembly as recited in claim 17, wherein the piston rod is configured to move between the extended and retracted positions irrespective of the state of the tubular section relative to the latch mechanism.

19. The pivoting bin assembly as recited in claim 14, wherein the latch mechanism body is cylindrical and has slots, the latch mechanism further including pins that are disposed in the slots and in which axial movement of the poppet retainer causes the pins to move within the slots.

20. The pivoting bin assembly as recited in claim 19, wherein the tubular section includes a narrowed diametrical portion adjacent the end extending into the latch mechanism.

21. The pivoting bin assembly as recited in claim 20, including a set of spring clips or spring loaded pins within a recessed portion of the cylindrical body of the latch mechanism, the spring clips or spring loaded pins being movable radially within the recessed portion based on movement of the tubular section, the pins and the poppet retainer.

22. The pivoting bin assembly as recited in claim 20, including a flexible sleeve disposed over at least an axial portion of the tubular section, the flexible sleeve being axially movable thereon.

23. The pivoting bin assembly as recited in claim 18, wherein the assembly housing further retains a hydraulic damping assembly for damping movement of the piston rod.

24. The pivoting bin assembly as recited in claim 17, wherein the latch mechanism body has a defined cavity and a set of movable balls disposed within an inner cavity of the body that are configured to move to a first position in which the latch mechanism retains the spring retainer and a second position under increased load that deflects the load measurement spring, the second position enabling release of the spring retainer.

25. The pivoting bin assembly as recited in claim 17, in which the latch mechanism includes first and second camming members, one of the camming members including pins configured to move within defined slots formed in a latch mechanism body and at least one of the first and second camming members based on the load in the pivoting stowage bin.

26. The pivoting bin assembly as recited in claim 25, in which one of the first and second camming members is configured to rotate at least partially after the predetermined load has been placed in the pivoting bin, wherein the rotation of the camming member creates different cam slot paths in which the slot paths followed determines the state of the at least one lift assist spring.

* * * * *